US007809793B2

(12) United States Patent
Kimura et al.

(10) Patent No.: US 7,809,793 B2
(45) Date of Patent: Oct. 5, 2010

(54) INFORMATION TRANSMISSION SYSTEM BY COLLABORATIVE FILTERING, INFORMATION PROCESSING APPARATUS FOR USE WITH INFORMATION PROCESSING SYSTEM AND PROGRAM FOR USE WITH INFORMATION PROCESSING APPARATUS

(75) Inventors: Takaomi Kimura, Tokyo (JP); Atsushi Hashizume, Tokyo (JP); Tomoki Shiono, Kanagawa (JP)

(73) Assignee: Sony Corporation, Tokyo (JP)

( * ) Notice: Subject to any disclaimer, the term of this patent is extended or adjusted under 35 U.S.C. 154(b) by 881 days.

(21) Appl. No.: 11/149,238

(22) Filed: Jun. 10, 2005

(65) Prior Publication Data

US 2006/0047623 A1 Mar. 2, 2006

(30) Foreign Application Priority Data

Jun. 22, 2004 (JP) ............................. 2004-184015

(51) Int. Cl.
*G06F 15/16* (2006.01)
(52) U.S. Cl. .................................................... 709/205
(58) Field of Classification Search ................ 382/236, 382/243, 253, 232, 248, 238; 375/E7.226, 375/E7.211, 240.12, 240.08, E7.209, 240.16, 375/E7.145, E7.167, 240.24, E7.238, E7.14, 375/E7.266, 240.18; 707/3, 104.1, 4, E17.109, 707/2; 99/328, 335, 443 C, 386, 326; 348/415.1, 348/700, E7.047; 709/205
See application file for complete search history.

(56) References Cited

U.S. PATENT DOCUMENTS 5,761,662 A * 6/1998 Dasan ......................... 707/10

5,907,597 A * 5/1999 Mark ....................... 379/93.03
5,983,214 A * 11/1999 Lang et al. .................... 707/1

(Continued)

FOREIGN PATENT DOCUMENTS

JP 2002-298007 10/2002

(Continued)

OTHER PUBLICATIONS

Pierre Agostini, "Diffusion Protocol by Content Characterization", Proceedings of the International Conference on World Wide Web, XP-002296124, Jan. 2000, pp. 1-21.

*Primary Examiner*—Benjamin R Bruckart
*Assistant Examiner*—Saad A Waqas
(74) *Attorney, Agent, or Firm*—Oblon, Spivak, McClelland, Maier & Neustadt, L.L.P.

(57) ABSTRACT

A system is disclosed by which the load when a user tries to selectively communicate through a network with a person having information useful to the user from among a large number of persons can be distributed suitably on the network without the necessity for a large-scale network server. The user transmits profile information from a user apparatus to a plurality of different apparatus of different users. Each different apparatus uses the profile information and profile information of the user of the different apparatus to calculate correlativity between the users and sends back a result of the calculation. The user apparatus selects, from the results of the correlativity calculation from the different apparatus, an apparatus of a communication opposite party who exhibits a comparatively high correlativity, and issues a notification of or receives utilization information to or from the selected apparatus by communication.

7 Claims, 16 Drawing Sheets

U.S. PATENT DOCUMENTS

| | | | |
|---|---|---|---|
| 6,775,664 B2* | 8/2004 | Lang et al. | 707/3 |
| 7,130,807 B1* | 10/2006 | Mikurak | 705/7 |
| 7,296,031 B1* | 11/2007 | Platt et al. | 707/102 |
| 7,512,653 B2* | 3/2009 | Krishnasamy et al. | 709/204 |
| 2002/0184128 A1* | 12/2002 | Holtsinger | 705/35 |
| 2003/0093790 A1* | 5/2003 | Logan et al. | 725/38 |
| 2004/0097287 A1* | 5/2004 | Postrel | 463/41 |
| 2004/0199584 A1* | 10/2004 | Kirshenbaum et al. | 709/205 |
| 2005/0050119 A1* | 3/2005 | Vandanapu | 708/207 |
| 2005/0198015 A1* | 9/2005 | Sezan et al. | 707/3 |

FOREIGN PATENT DOCUMENTS

| | | |
|---|---|---|
| WO | WO 01/46843 A2 | 6/2001 |
| WO | WO 03/083723 | 10/2003 |

\* cited by examiner

F I G. 5
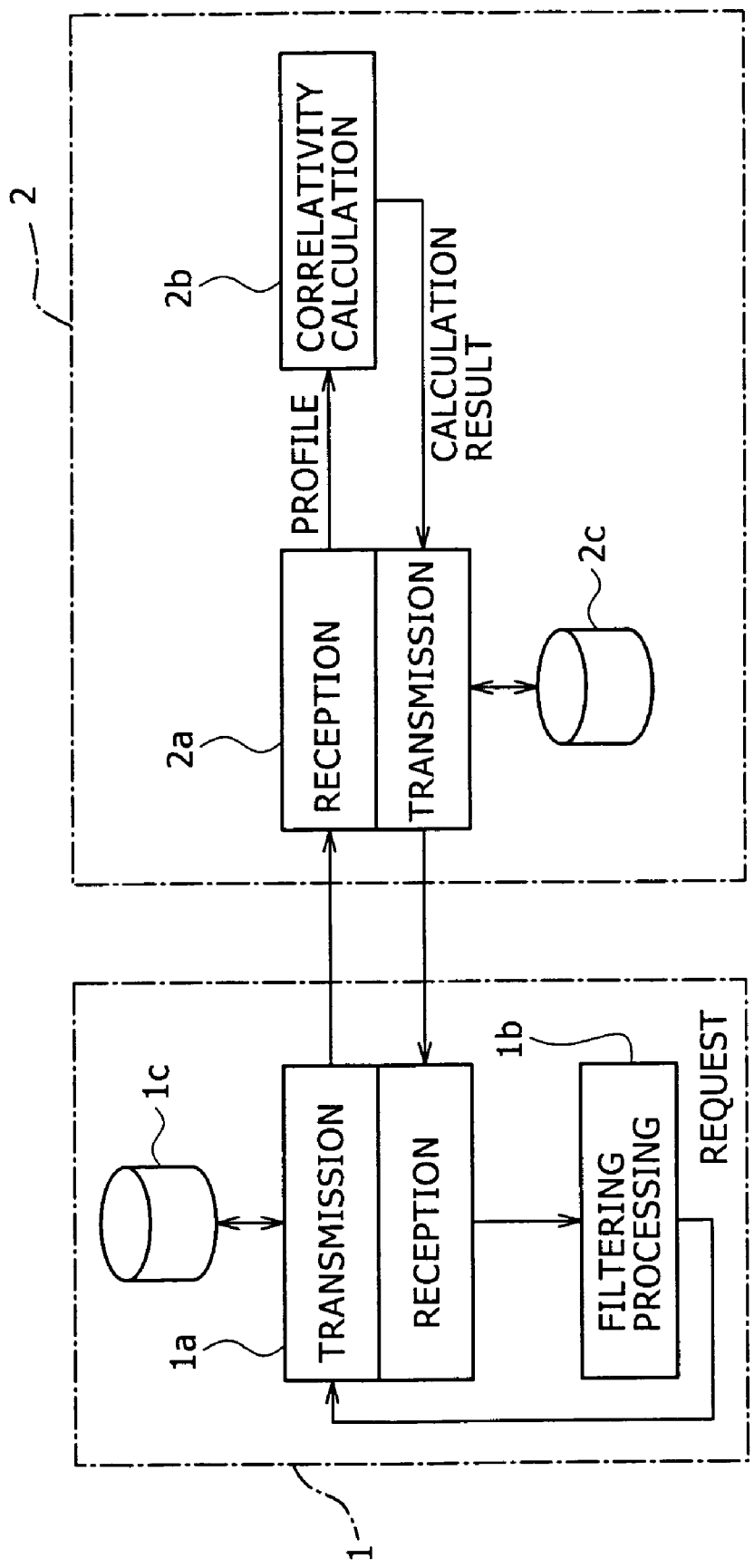

FIG.23

|   | JAZZ | J-POP | CLASSIC |
|---|---|---|---|
| A | 2 | 5 | 4 |
| B | 1 | 5 | 4 |
| C | 5 | 2 | 2 |
| D | 3 | 5 | 1 |

INFORMATION TRANSMISSION SYSTEM BY COLLABORATIVE FILTERING, INFORMATION PROCESSING APPARATUS FOR USE WITH INFORMATION PROCESSING SYSTEM AND PROGRAM FOR USE WITH INFORMATION PROCESSING APPARATUS

BACKGROUND OF THE INVENTION

This invention relates to an information transmission system by collaborative filtering wherein a user can send or exchange content data, a program or the like to or with a communication opposite party who has likes and tastes similar to that of the user through a network, and more particularly to a technique for use with an information transmission system of the type described for making it possible for different persons to exchange information in which the persons are much interested with each other through communication between the persons without presupposing the presence of a server which stores a large amount of data and executes a large amount of calculation.

Collaborative filtering is known as a technique which is utilized where users having similar likings or preferences perform information exchange or the like with each other through a network. One of collaborative filtering systems is disclosed, for example, in Japanese Patent Laid-Open No. Hei 9-265478 (hereinafter referred to as Patent Document 1). According to the collaborative filtering, for example, profile information of individual users is compared to calculate a correlativity therebetween to search for a user (cooperation opposite party) having a comparatively high correlativity. Various systems which use this technique have been proposed. However, most of the systems adopt a form of a network centering on a network server (the form is called client-server model and hereinafter referred to simply as "C/S model"). The reason is that the collaborative filtering technique requires a large amount of data and a large amount of calculation.

Meanwhile, in a system wherein contents of music or images are recommended to a user as is disclosed, for example, in Japanese Patent Laid-Open No. 2003-173350 (hereinafter referred to as Patent Document 2), if a user sends a viewing history in the past through the Internet, then contents are recommended from the server to a client machine of the user. Also the system basically uses a form of the C/S model and essentially requires a large-scale server.

A system of another form of a network wherein a population is formed through interpersonal communication (the form is called Peer to Peer network model and hereinafter referred to as "P2P model") does not require a centralized management mechanism configured using a server machine. Therefore, a system of the P2P model is advantageous in terms of the operation cost. As one of systems of the type described, for example, a system is known wherein profile information of a user is produced based on terminal use history information and stored into a memory card or a like storage and specialized information is provided to the user. A system of the type described is disclosed, for example, in Japanese Patent Laid-Open No. 2001-14324 (hereinafter referred to as Patent Document 3).

As a technique which is utilized by a user to selectively communicate only with a person who owns information useful to the user from among a large number of persons through a network, user profiling is available, and a system which utilizes an individual profile in which profile data obtained by quantifying the individual likes and tastes are registered is known and disclosed, for example, in Japanese Patent Laid-Open No. 2000-76304 (hereinafter referred to as Patent Document 4). According to the system, for example, a certain user extracts a text from information communicated with another user and performs word division or frequency calculation to produce a profile of the user itself. Further, interpersonal communication is performed to produce a profile wherein the appearance frequency degree is evaluated appropriately through comparison with a group which includes the user.

SUMMARY OF THE INVENTION

However, the conventional systems have a problem that a network server which can process a large amount of calculation at a high speed is essentially required or a high load in calculation processing (tasks or an amount of calculation to be shared) is imposed on a particular apparatus.

For example, works which should originally be carried out by a server which collects and processes profile data of users in order to implement collaborative filtering include the following items.

At what position a user itself exists in a space (multi-dimensional vector space based on profile information of individual users);

Who has likes and tastes similar to that of the user itself; and

Which contents should be recommended.

Increase in scale of a network server which takes charge of calculation processing for quantitatively specifying the items mentioned leads to increase of the operation cost, and all information must be managed centrally by the server.

Meanwhile, the collaborative filtering technique in the form of a P2P model can be used in the following examples of processing.

(1) A user performs broadcast communication for inviting communication opposite parties to the entire network and receives a list of contents owned by and returned from the communication opposite parties;

(2) Calculation for collaborative filtering is performed in a computer of the user itself to specify recommendable contents; and (3) As occasion demands, the user communicates again with an opposite party who owns the desired contents to acquire the contents.

According to this method, since it is necessary for each user to perform data storage and calculation for collaborative filtering on a computer of the user itself, the burden of processing is heavy. In particular, since the amount of calculation of a computer on the data requesting side increases in proportion to the scale of the network and the load is not distributed on the network, the method has a problem that it is not suitably applied to utilization of a large-scale network.

Therefore, it is an object of the present invention to provide a system by which the load when a user tries to selectively communicate through a network with a person having information useful to the user from among a large number of persons can be distributed on the network.

In order to attain the object described above, according to an embodiment of the present invention, there is provided an information transmission system by collaborative filtering for transmitting and receiving profile information between different apparatuses through a network to perform notification or exchange of utilization information between communication opposite parties having a high correlativity, including a step of transmitting profile information of a user who uses a first apparatus from the first apparatus to a plurality of second apparatus, a step, performed by any of the second apparatus which has received the profile information from the first apparatus, of calculating a correlativity between profile information of a user of the second apparatus and the received profile information and transmitting a result of the calculation to the first apparatus, and a step, performed by the first apparatus, of selecting the apparatus of those communication opposite parties which exhibit a high correlativity from the results of the correlativity calculation sent back to the first apparatus and issuing a request for or receiving utilization information to or from the selected apparatus by communication with the selected apparatus.

According to another embodiment of the present invention, there is provided an information processing apparatus for use with an information transmission system by collaborative filtering for transmitting and receiving profile information through a network to perform notification or exchange of utilization information to or from communication opposite parties having a high correlativity, including a calculation section for calculating, when profile information of a different user of a different apparatus is received from the different apparatus, a correlativity between the received profile information and profile information of a user of the information processing apparatus, and a transmission section for sending back a result of the correlativity calculation by the calculation section to the different apparatus.

According to a further embodiment of the present invention, there is provided an information processing apparatus for use with an information transmission system by collaborative filtering for transmitting and receiving profile information through a network to perform notification or exchange of utilization information to or from communication opposite parties having a high correlativity, including a transmission section for transmitting profile information of a user of the information processing apparatus to a plurality of different apparatus which are individually used by different users, a selection section for selecting, when results of a correlativity calculation sent back from the different apparatus are received, those apparatus of communication opposite parties who exhibit a comparatively high correlativity, and a requesting or receiving section for requesting the selected apparatus for utilization information or receiving utilization information from the selected apparatus.

According to a still further embodiment of the present invention, there is provided a program for use with an information processing apparatus for transmitting and receiving profile information through a network to perform notification or exchange of utilization information to or from communication opposite parties having a high correlativity, including the steps of calculating, when profile information of a different user of a different apparatus is received from the different apparatus, a correlativity between the received profile information and profile information of a user of the information processing apparatus, and sending back a result of the correlativity calculation to the different apparatus.

According to a yet further embodiment of the present invention, there is provided a program for use with an information processing apparatus for transmitting and receiving profile information through a network to perform notification or exchange of utilization information to or from communication opposite parties having a high correlativity, including the steps of transmitting profile information of a user of the information processing apparatus to a plurality of different apparatus which are individually used by different users, selecting, when results of a correlativity calculation sent back from the different apparatus are received, those apparatus of communication opposite parties who exhibit a comparatively high correlativity, and requesting the selected apparatus for utilization information or receiving utilization information from the selected apparatus.

With the information transmission system and apparatus and the programs, a user can transmit profile information of the user itself to opposite parties such that only a result of calculation of a correlativity is sent back from each of the opposite parties to the user, and then determine a communication opposite party based on the received results of calculation. Consequently, the information transmission system and apparatus and the programs are advantageous in the load distribution on the network and reduction of the calculation load. In other words, a large-scale network server for collecting and processing a large amount of profile information at a high speed is not required, and a high load of calculation processing is not concentrated on a particular node.

Further, the information transmission system and apparatus and the programs are advantageous in that a system can be configured which is suitable for load distribution on a network where a user tries to select a communication opposite party having a high correlativity to the user itself from among a large number of persons and communicate with the selected communication opposite party. Since the system can be implemented in the form of a network, for example, by inter-personal communication without taking the presence of a large-scale network server as a prerequisite, the information transmission system and apparatus and the programs are advantageous in terms of operation and management.

In the calculation process of the correlativity, a vector spatial distance based on profile information is calculated by each of the communication opposite parties, and the user receives results of the calculation and selects an apparatus of a communication opposite party whose vector spatial distance is in the minimum or is lower than a reference value determined in advance. Consequently, a complicated calculation process is not imposed on any opposite party apparatus (processing burden can be reduced).

Further, taking it into consideration that, where the correlativity calculation is performed using individual data such as a contents list, a large amount of calculation is involved, preferably the profile information includes data for classifying utilization information including content data or a program (in other words, preferably likes, tastes or the like of a user is classified using metadata suitable for classification, for example, data of a genre, a category or the like).

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a block diagram showing an example of a configuration of an information processing apparatus to which the present invention is applied;

FIG. 23 is a schematic view illustrating degrees of interest for different genres among a plurality of users.

DETAILED DESCRIPTION OF THE PREFERRED EMBODIMENT

Figure 1:
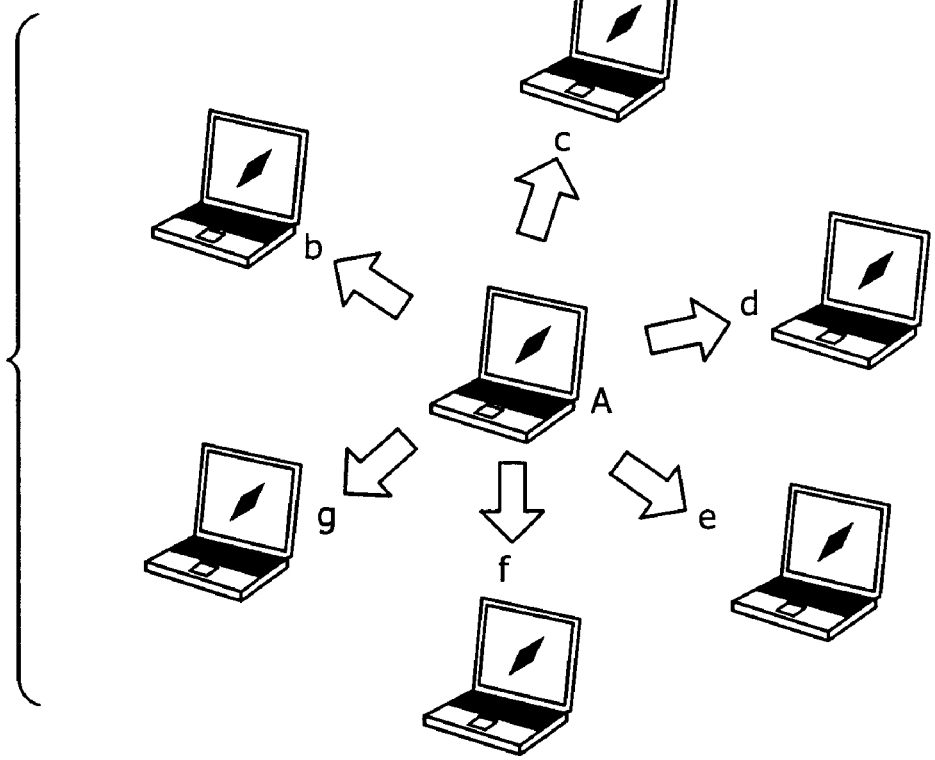
FIG. 1 is a schematic view showing a general form of a system to which the present invention is applied and illustrating broadcast communication from an apparatus of a user to apparatus of different users.

The present invention provides an information processing system by collaborative filtering for making it possible, for example, where a plurality of computers connected to each other by a network is supposed, to transmit and receive profile information of users between different apparatuses by interpersonal communication without the presence of a network server as a necessary condition so that any user can communicate or exchange content data, programs and so forth with a communication opposite party having likes and tastes similar to that of the user itself. In other words, even if a large-scale server is not included in the network, different computers connected with an equal relationship to each other can communicate with each other in a one-on-one (Peer to Peer) relationship. In short, in the system of the present invention, works to be performed in order to implement collaborative filtering are carried out by individual computers without the intervention of a server.

However, in a form wherein data storage and calculation for collaborative filtering are performed by a computer of each user, it matters that the amount of calculation increases in proportion to the network scale as described hereinabove (although one of possible solutions to the problem is a form that, for example, a large amount of data is acquired and used for calculation only for the first time of operation and, in the later time of operation, only difference information is acquired from nodes of the network and used to perform calculation of differences, the processing is rather cumbersome).

Therefore, in the following, a form of a configuration is described which can use a collaborative filtering technique to allow a user of a computer to find out an opposite party who has likes and tastes similar to that of the user through distributed processing of the individual computers.

FIGS. 1 to 4 illustrate an outline of the information transmission system according to the present invention. The information transmission system is effective, for example, where a user transmits profile information (for example, a profile including a quantified likes and tastes, a contents list used by each user and so forth) of the user itself through broadcast communication to different apparatus so that each of the different apparatus may calculate a correlativity (for example, a vector spatial distance) to the user. Then, the user acquires a result of the calculation from each of the apparatus to select or specify communication opposite parties so that contents and so forth are introduced by a person who has likes and tastes similar to that of the user or a population including the user and an opposite party or parties who are similar to the user is formed (grouping). This makes it possible for the user to select those persons who have information useful to the user from among a large number of persons and communicate with the selected persons.

It is to be noted that, in FIGS. 1 to 4, reference character "A" represented in the capital letter denotes a node of the user itself on the network, and an apparatus (hereinafter referred to as "apparatus A") used by the user itself at the node is connected to apparatus used by different users. Meanwhile, reference characters "b", "c" and so forth represented in the small letters denote nodes different from the node of the user itself, and an apparatus (hereinafter referred to, for the node "x", as "apparatus x") used by a user at each of such nodes is connected to the apparatus A. For each of the apparatus, a computer, a personal portable terminal, a mobile communication terminal apparatus, a video apparatus, an audio apparatus or the like may be used. However, each apparatus is configured such that it can communicate (for example, interpersonal communication) through a computer network such as the Internet, a WAN (Wide Area Network) or a LAN (Local Area Network). Therefore, it is possible to transmit and receive profile information of users between different ones of the apparatus or communicate or exchange data (for example, video or audio content data or the like), programs or utilization information including addresses or location information (URL: Uniform Resource Locator and so forth) between any user and a communication opposite party who has likes and tastes similar to that of the user itself.

Referring first to FIG. 1, broadcast communication is performed from the apparatus A of the user itself to the other apparatus b, c, d, . . . . In other words, the apparatus A transmits a profile, a contents list and so forth of the user itself at a time to a large number of communication opposite parties. Each of the apparatus on the network having received the transmitted information calculates a correlativity between the user of the apparatus A and the user of the receiving side apparatus using the profile information received from the apparatus A and profile information of the user of the receiving side apparatus.

Figure 2:
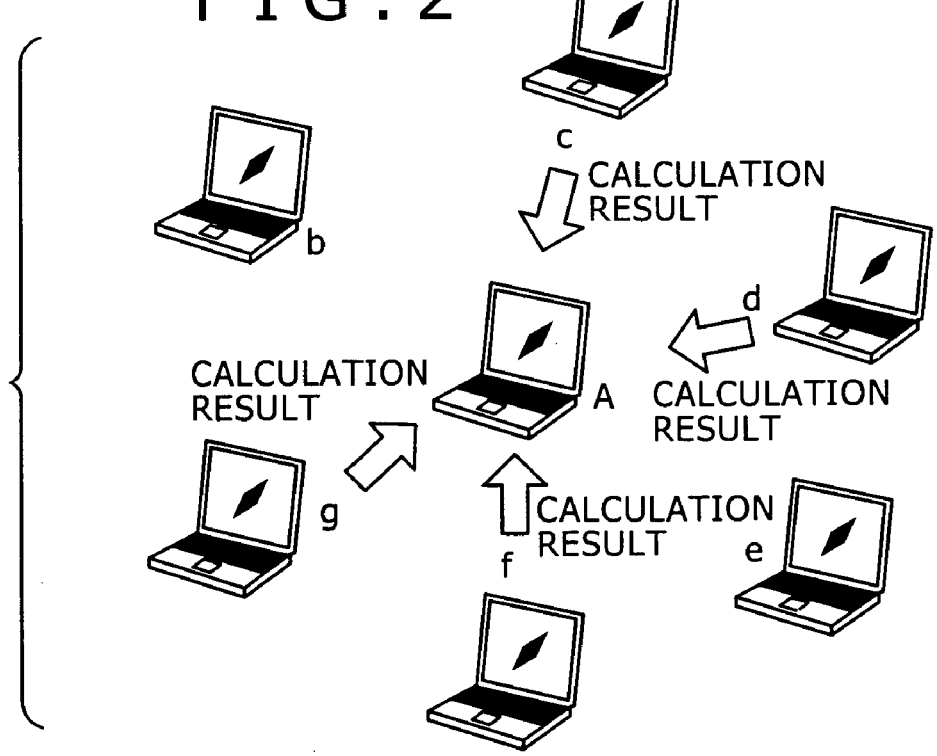
FIG. 2 is a similar view but illustrating a manner wherein a calculation result of a correlativity is returned from users who respond to the broadcasting.

In FIG. 2, the apparatus c, d, f and g respond to the calling (transmission) from the apparatus A. Each of the apparatus c, d, f and g compares the profile and contents list of the transmission source with a profile and a contents list owned thereby to determine a vector spatial distance between the two (a lower value of the distance signifies a higher correlativity between the two), and sends back a result of the calculation to the apparatus A of the source of transmission.

The apparatus A selects apparatus of those communication opposite parties which exhibit comparatively high correlativity values based on the results of correlativity calculation sent back thereto and notifies the apparatus of information by communication or receives necessary information from the apparatus.

Figure 3:
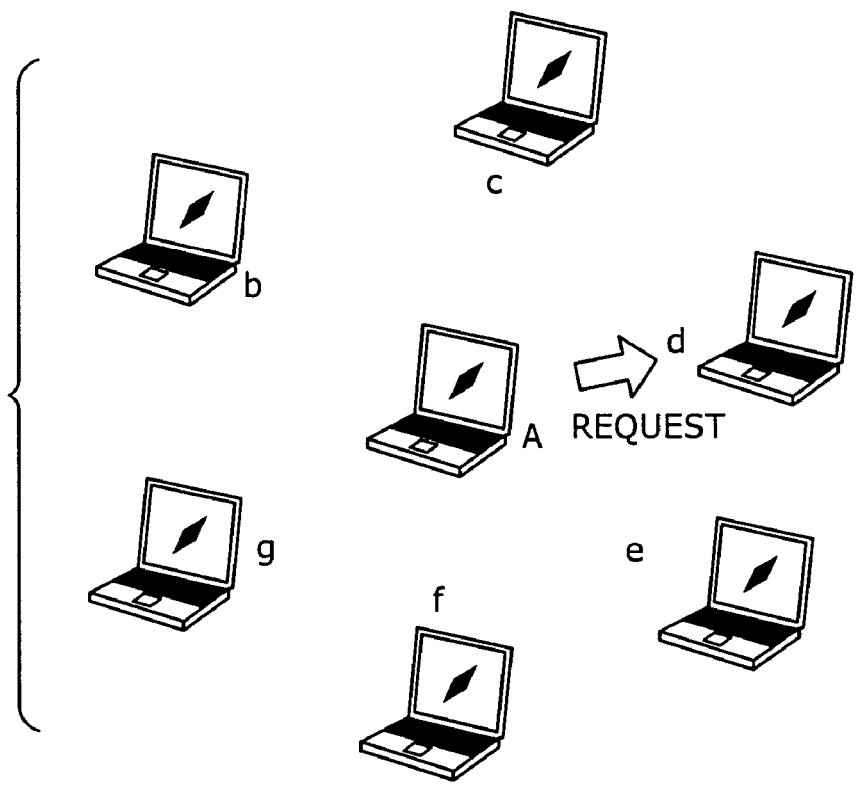
FIG. 3 is a similar view but illustrating a manner wherein the user specifies an opposite party who has a comparatively high correlativity and issues a request to the specified opposite party.
Figure 4:
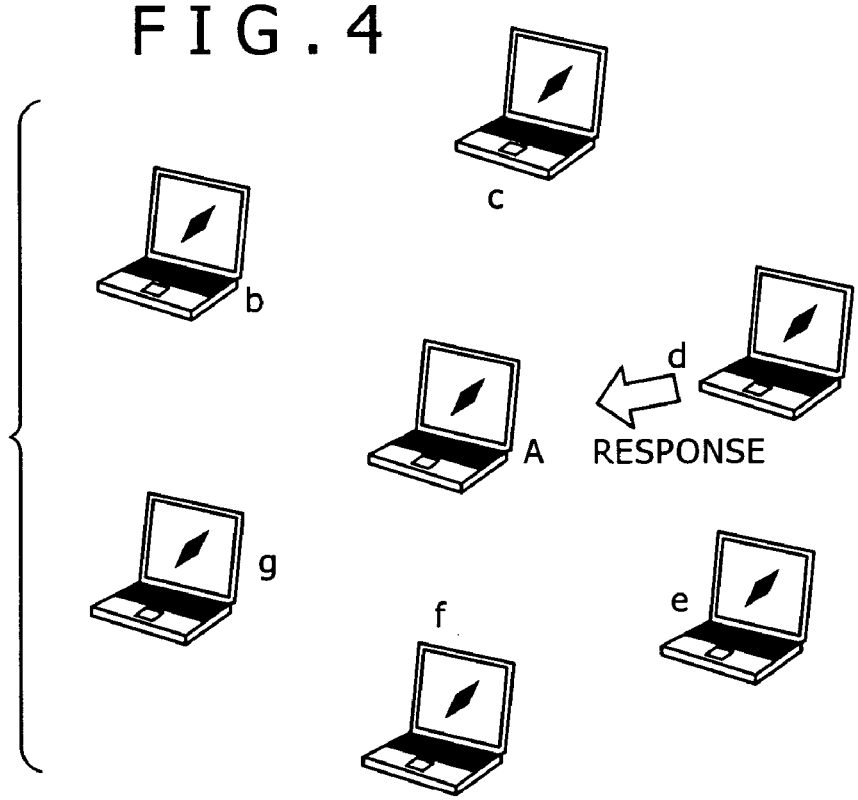
FIG. 4 is a similar view but illustrating a manner wherein a response to the request is issued.

In the example illustrated in FIG. 2, calculation results of the vector spatial distance are returned from the apparatus c, d, f and g to the apparatus A. Then, for example, as seen in FIG. 3, the apparatus A specifies, based on the received vector spatial distances, an apparatus (in the example illustrated, the apparatus d) of an opposite party who has likes and tastes most similar to that of the user of the apparatus A. Then, the apparatus A issues a request for recommendable contents or the like to the opposite party apparatus.

Then, the apparatus d having received the request for contents detects information to be transmitted (for example, recommendable contents or an address of the same and so forth) using profiles and contents lists of the user of the apparatus d and the user of the apparatus A and transfers the information back to the apparatus A of the transmission source.

FIG. 5 illustrates a concept of an example of a configuration of an information processing apparatus according to the present invention. Referring to FIG. 5, an information processing apparatus 1 shown corresponds to the apparatus A described hereinabove, and another information processing apparatus 2 corresponds to any other apparatus (b, c, . . . ).

The information processing apparatus 1 includes a transmission and reception section 1a, a filtering processing section 1b, and a storage section 1c, and transmits profile information of a user of the information processing apparatus 1 itself to the information processing apparatus 2. In short, the storage section 1c has a profile, a contents list and so forth of the user of the information processing apparatus 1 stored therein, and such information is transmitted from a transmission section which forms the transmission and reception section 1a to the information processing apparatus 2.

The information processing apparatus 2 includes a transmission and reception section 2a, a correlativity calculation section 2b, and a storage section 2c, and receives profile information from the information processing apparatus 1 by means of a reception unit which forms the transmission and reception section 2a. The correlativity calculation section 2b uses the profile information received from the information processing apparatus 1 and profile information of a user of the information processing apparatus 2 to perform correlativity calculation between the users. It is to be noted that the profile information of the user of the information processing apparatus 2 is stored in the storage section 2c.

A calculation result (vector spatial distance and so forth) by the correlativity calculation section 2b is transmitted back to the information processing apparatus 1. For example, a program used in the information processing apparatus 2 has a step of calculating, when the information processing apparatus 2 receives profile information of the different user of the information processing apparatus 1 from the information processing apparatus 1, the vector spatial distance between the users using the received profile information and the profile information of the user of the information processing apparatus 2 and sending back a result of the calculation to the information processing apparatus 1.

The reception unit which forms the transmission and reception section 1a signals the calculation result to the filtering processing section 1b.

The filtering processing section 1b tabulates a plurality of results of correlativity calculation sent back from different apparatus and selects an apparatus of a communication opposite party which exhibits a high correlativity. More particularly, correlativity values between a certain user and the other users are checked to extract an apparatus of a communication opposite party which exhibits a minimum vector spatial distance calculated based on the individual profile information or an apparatus of a communication opposite party or a plurality of apparatus of communication opposite parties whose vector spatial distance is lower than a reference value determined in advance. The vector spatial distance "L" between users in a vector space can be represented, where the difference between individual profile data is represented by "$\Delta E_i$" (for the dimension N, i=1, 2, . . . , N), generally by "$L=\Sigma(\alpha_i \cdot f(\Delta E_i))$" where $\Sigma$ signifies the sum total with regard to i. Here, "f(X)" is a function for obtaining a cumulative effect of the magnitude (positive value) of the difference, and X to the second power, the absolute value of X (|X|) or the like is used. The coefficient parameter "$\alpha_i$" signifies a weighting coefficient for weighting (for example, "$\alpha_i=0$" signifies no weighting, and in this instance, the values "$f(\Delta E_i)$" are added equally).

In the determination process of the vector spatial distance L, where a reference value (threshold value) therefor is represented by "Ls", if an opposite party who satisfies "$L \leq Ls$" is found, then the object of collaborative filtering to find a person having likes and tastes similar to that of the user itself can be achieved. It is to be noted that, as regards the value of the reference value Ls, where it is set as a fixed value, it possibly occurs that an opposite party cannot be found, and therefore, preferably such a countermeasure is taken that, for example, the Ls value can be set continuously or stepwise in response to designation, selection or the like by a user operation or opposite parties are displayed in a ranking form in the ascending order of the L value.

The information processing apparatus 1 searches for an apparatus of an opposite party having a comparatively low vector spatial distance L and transmits a request for contents or the like to the searched out apparatus. The apparatus of the opposite party receiving the request responds to the request as occasion demands, and consequently, the apparatus of the transmission source can acquire desired contents and so forth.

It is to be noted that a program used in the information processing apparatus 1 includes a step of transmitting profile information of the user itself to the information processing apparatus 2 used by different users, another step of receiving results of correlativity calculation returned from the information processing apparatus 2 to find a communication opposite party having a comparatively high correlativity and detecting an information processing apparatus used by the communication opposite party, and a further step of issuing a request for utilization information to the information processing apparatus or receiving such utilization information from the apparatus of the communication opposite party.

In a configuration for implementing the information processing apparatus 1 and 2, a CPU (Central Processing Apparatus), a memory, input/output ports, a storage device for which a hard disk or the like is used, a communication device for network connection, a program for being interpreted and executed by the CPU and so forth are used. However, in FIG. 5, only functional elements by them are shown. Further, although it is described that the information processing apparatus 1 is a transmission side apparatus and the information processing apparatus 2 are reception side apparatus for the convenience of description, in an actual apparatus form, each information processing apparatus may possibly act as any of a transmission side apparatus and a reception side apparatus in a relationship to another apparatus. In other words, each information processing apparatus has functions of both of the information processing apparatus 1 and 2.

According to the system described above, since, if profile information of a user is delivered to an opposite party, then the opposite party side calculates the correlativity, the load of calculation can be distributed advantageously. In other words, there is no necessity to collect profile information of individual users at one place and calculate or store correlativity values. However, the system has a different aspect from the aspect of conventional collaborative filtering that each user refers to contents owned by all of the other persons with respect to contents owned by the user itself to recommend suitable contents. Thus, the system is effective to such an object as to receive, after the user finds a person having likes and tastes similar to that of the user, an introduction of recommendable contents or the like from the person or perform grouping with those persons who have likes and tastes similar to that of the user.

Further, in order for the user to cooperate with a communication opposite party on the network to calculate a vector spatial distance, broadcast communication of a profile, a contents list and so forth of the user itself is required, and as the network scale increases, the traffic (communication amount) of the network increases. Therefore, as an index for calculation of a vector spatial distance from the opposite party, it is appropriate to use, rather than a list, URLs or the like of contents themselves, metadata obtained by abstraction of them by one stage. In other words, preferably not information for specifying content data or a program itself but data representative of a category or attribute for identifying the type of the content data or program is used as the profile information.

For example, a system which transmits music information may have such a form that tunes are classified in regard to different genres of the classic, jazz, rock, popular and so forth or in regard to the sex, age and so forth of the singer and a profile of a user wherein the number of tunes listened till now is quantified into a number of times and then such profile data are transmitted between different apparatuses to achieve metrization of likes and tastes.

A profile including classification data of content data or a program is stored into a storage section of each apparatus and is suitably updated at any time as the likes and tastes of the user changes. For example, in the case of music contents, the following data may be involved.

Genre information or the like provided as attribute information of a tune;

Genre information, attribute information or the like inputted or selected by the user through decision of the tune; and Genre information, attribute information or the like automatically decided based on a result of analysis of a characteristic amount of music data when the user reproduces or recorded contents.

By utilizing such profiling as described above to exchange desired information between users who are interested in the same matter, the performance in convenience can be enhanced (or information in which the user is not interested is excepted at the stage of selection of communication opposite parties).

Figure 6:
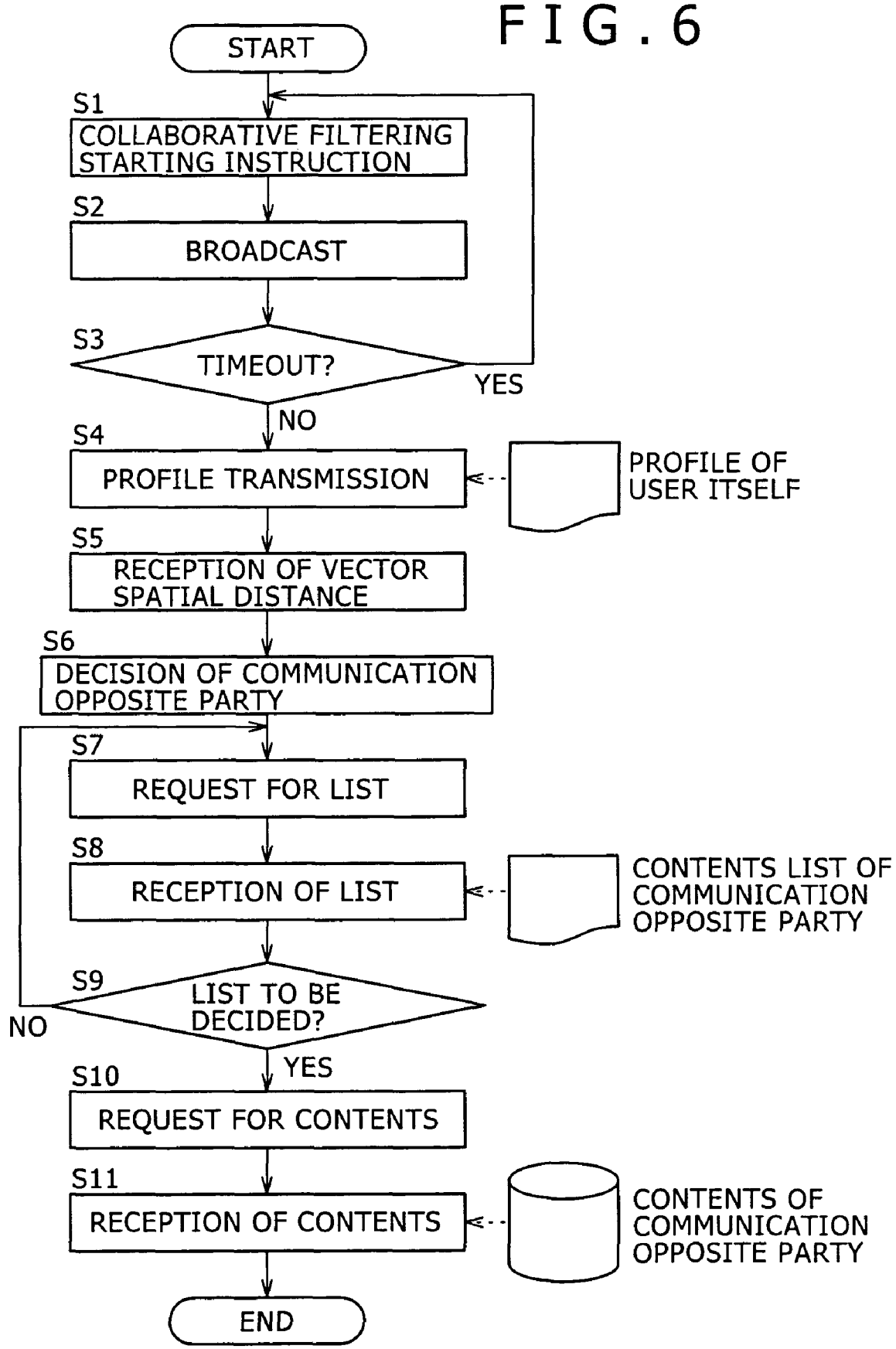
FIG. 6 is a flow chart illustrating an example of an application process executed by the information processing apparatus of FIG. 5.

FIG. 6 illustrates in flow chart a processing procedure by an application which uses the program according to the present invention.

Referring to FIG. 6, first at step S1, a starting instruction of collaborative filtering is issued. Then at step S2, broadcast communication is performed to invite the other users. Then at step S3, a response is waited until a predetermined period of time passes. If no response is received within the predetermined period of time, then the processing returns to step S1. However, if a response is received from any other different user, then the processing advances to step S4, at which the user transmits a profile of the user itself to the different user.

The apparatus of the opposite party receives the thus transmitted profile and performs calculation of a vector spatial distance. Then, when the apparatus transmits a result of the calculation, the calculation result is received at step S5.

At step S6, the user decides a communication opposite party having a high correlativity to the user itself from a plurality of calculation results received from different users (searches for an opposite party having a comparatively small vector space distance). Then at step S7, the user issues a request for a contents list (a list which describes, for example, URLs of contents and so forth) to the decided communication opposite party.

Then at step S8, the user receives the contents list, and then at step S9, the user determines whether or not the list should be decided. If the list should be decided, then the processing advances to step S10, but if the list is not decided, the processing returns to step S7 in order to select another list or to step S6 in order to change the communication opposite party.

At step S10, the user issues a request for contents in accordance with the decided contents list, and then at step S11, the user receives the intended contents. It is to be noted that, where the communication opposite party itself owns the content data itself, the user can receive the data, but if the communication opposite party does not own the content data itself, since the user receives a notification of address information on the network regarding the data, the user can access the link destination from the information to acquire the desired content data.

It is to be noted that, while, in the example described above, a contents request is issued after a decision process of a contents list received at step S8, the procedure is not limited to this, but alternatively such a different procedure may be adopted that the contents list of the opposite party received at step S8 and the contents list owned by the user itself are compared with each other to issue a request for desired contents to the opposite party (in particular, the user decides contents to be acquired based on the received contents list and issues a request for the contents so that the contents may be received).

In the example described above, in order to implement collaborative filtering described above in the network form of a P2P model, broadcast communication is used to search for a communication opposite party. However, although this does not matter very much within a narrow segment or a LAN, if the range is expanded to a large-scale network such as the Internet, then the method described becomes less realistic.

Network forms are divided into a C/S model, a pure P2P model and a "hybrid P2P model" which is of the middle type between the first two models. In the hybrid P2P model, a simplified server is prepared as one of nodes, and when a user tries to join or withdraw from the network, the user accesses the server. The server grasps addresses, profiles or the like of all of nodes which take part in the network. Then, when collaborative filtering is to be performed, an inquiry about information of those nodes which take part in at present can be issued to the clients. However, since the simplified server does not have a database for storing a large amount of data and does not perform complicated calculation, there is no trouble even if the simplified server is formed from a small-scale server, different from the C/S model.

Where a simplified server which mediates between clients is used as one of nodes and provides such simple information as a node list (Peer list or Peer profile list) in this manner, the operation cost for the server is low when compared with the C/S model.

In the pure P2P model which does not use a simplified server, all processes are performed between nodes. However, it is difficult to perform broadcast communication among a large number of persons on a large-scale network. Therefore, each node owns addresses, profiles or the like of nodes within a certain communication range centering on the node itself, and when collaborative filtering is to be performed, the node communicates with the known nodes which are within the range. Each of the nodes which receive the communication further communicates with opposite parties of a node list owned thereby to acquire necessary information and returns a result of the communication to the transmission source. If this procedure is repeated by a predetermined number of times, then each node can communicate with opposite parties in a wide range on the network.

Figure 7:
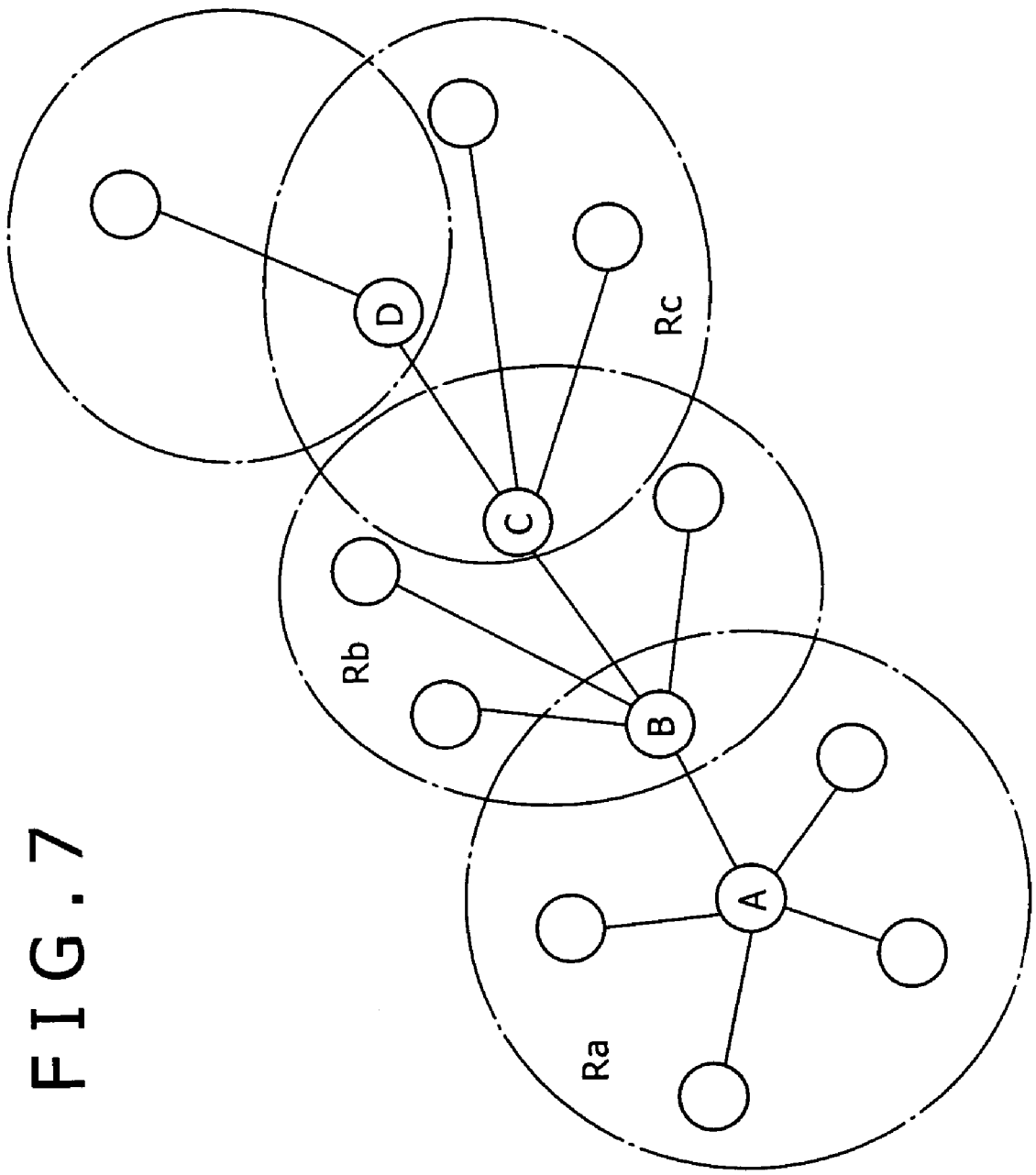
FIG. 7 is a diagrammatic view illustrating chained expansion of the communication range centered at the apparatus of the user itself in the form of a P2P model.

In an example shown in FIG. 7, a node "A" of a user itself communicates with another node "B" within a range denoted by "Ra", and the node "B" communicates with a further node "C" within another range denoted by "Rb". Further, the node "C" communicates with a still further node "D" within a further range denoted by "Rc". In this manner, the communication range is expanded in a chained fashion.

The communication range is expanded in a chained fashion preferably by following the procedure that any user communicates only with opposite parties who are registered in a node list of the user itself and also each of the opposite parties communicates with opposite parties who are registered in a node list of the opposite party in this manner.

FIGS. 8 to 11 illustrate a different example of the collaborative filtering technique described above. In the following, an application is described which performs collaborative filtering within a network with regard to a favorite (URL) of a browser and presents a recommendable web (Web) page to a user based on a result of the collaborative filtering.

In the present application, all favorites of a user on the network are acquired to perform collaborative filtering and a web page conforming to likes and tastes of the user is recommended to another user.

Figure 8:
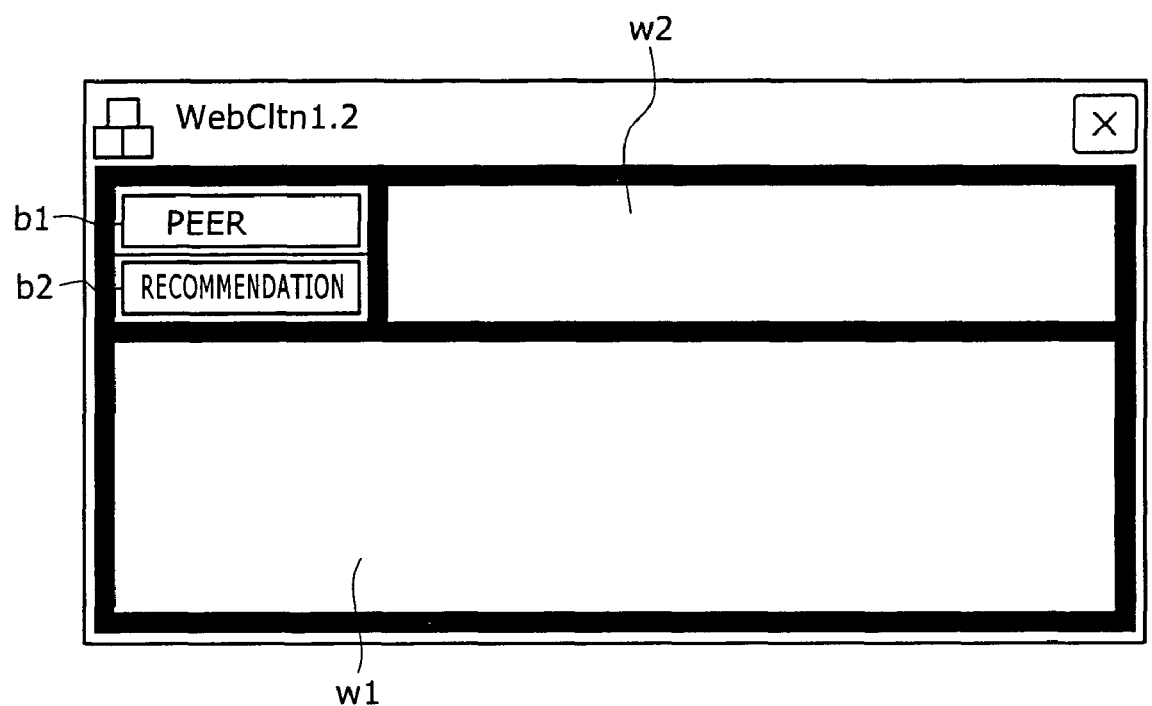
FIG. 8 is a schematic view showing an example of a display screen immediately after an application is started.

FIG. 8 shows an example of a display screen immediately after the application is started. The display screen includes two button objects b1 and b2. The button b1 is provided for Peer (opposite party) search, and the button b2 is provided for display of a favorite web page.

Figure 9:
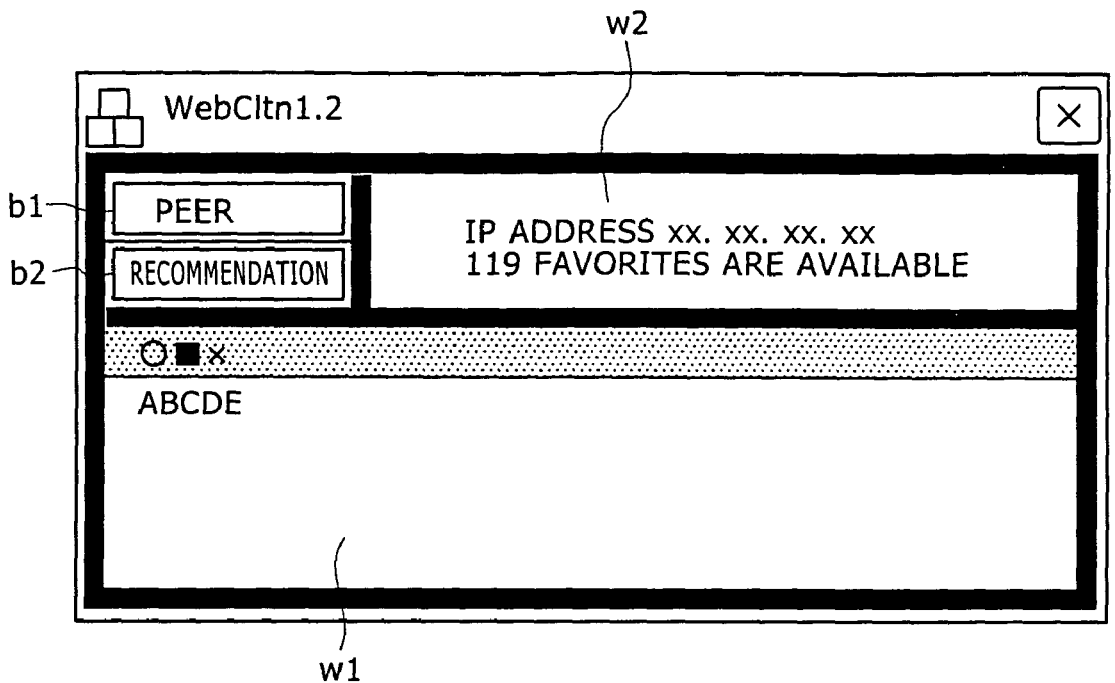
FIG. 9 is a similar view but showing an example of a display screen upon search for opposite parties.

FIG. 9 shows an example of a display screen after the button b1 is operated. In a window w1 positioned below the buttons b1 and b2, name information (handle or the like) for specifying a searched out opposite party is displayed. Further, in a window w2 for text display provided on the right side of the buttons b1 and b2, information regarding the searched out opposite party (an IP address, the number of favorites and so forth) is displayed.

Figure 10:
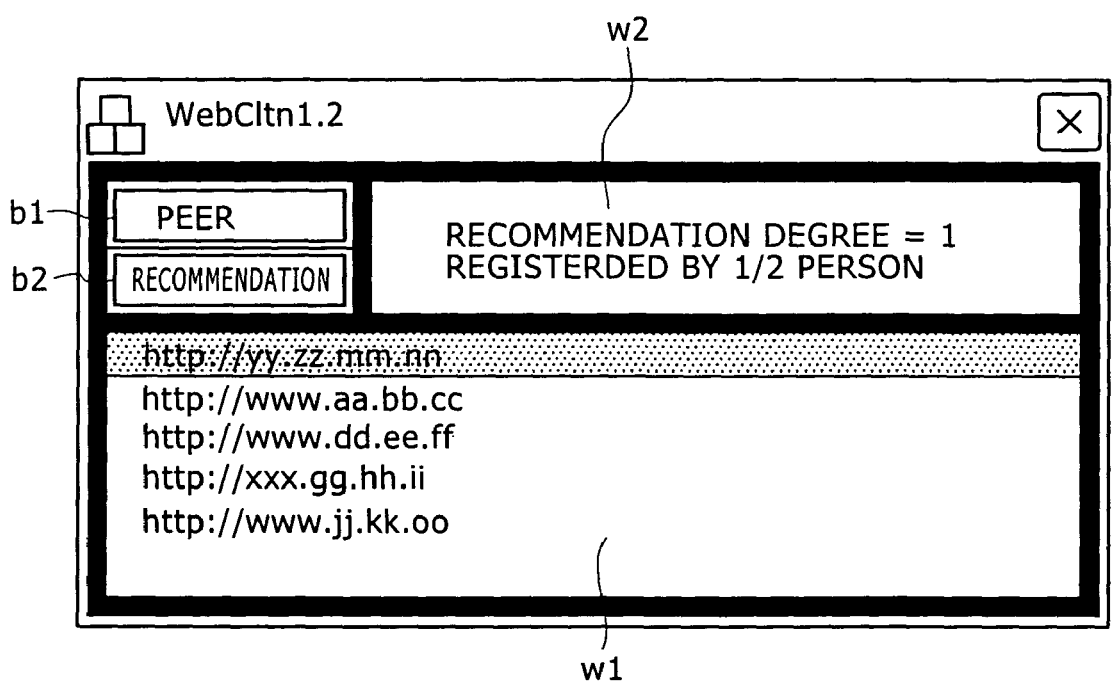
FIG. 10 is a similar view but showing an example of a list display screen of recommendable web pages.

FIG. 10 shows an example of a list display screen of recommended web pages after the collaborative filtering. A web page list is displayed in the window w1, and relating information (recommendation degree of a web page, the number of registered persons and so forth) is displayed in the window w2.

After the application is started, the screen of FIG. 8 appears, and if the button b1 is operated, then the names of users determined to have a comparatively high correlativity to the user itself from among those users which are connected to the network and with regard to which the same application is operating are displayed (refer to FIG. 9). In sort, opposite parties similar to the user are searched out and displayed from a result of calculation of the vector spatial distance calculated from profile information of the user itself and profile information of the other users.

If the button b2 is operated in this state, then the names and the addresses of web pages registered in favorites of all of the displayed users are acquired. Then, a list is produced and collaborative filtering is performed based on the list to produce a list of recommendable web pages.

Figure 11:
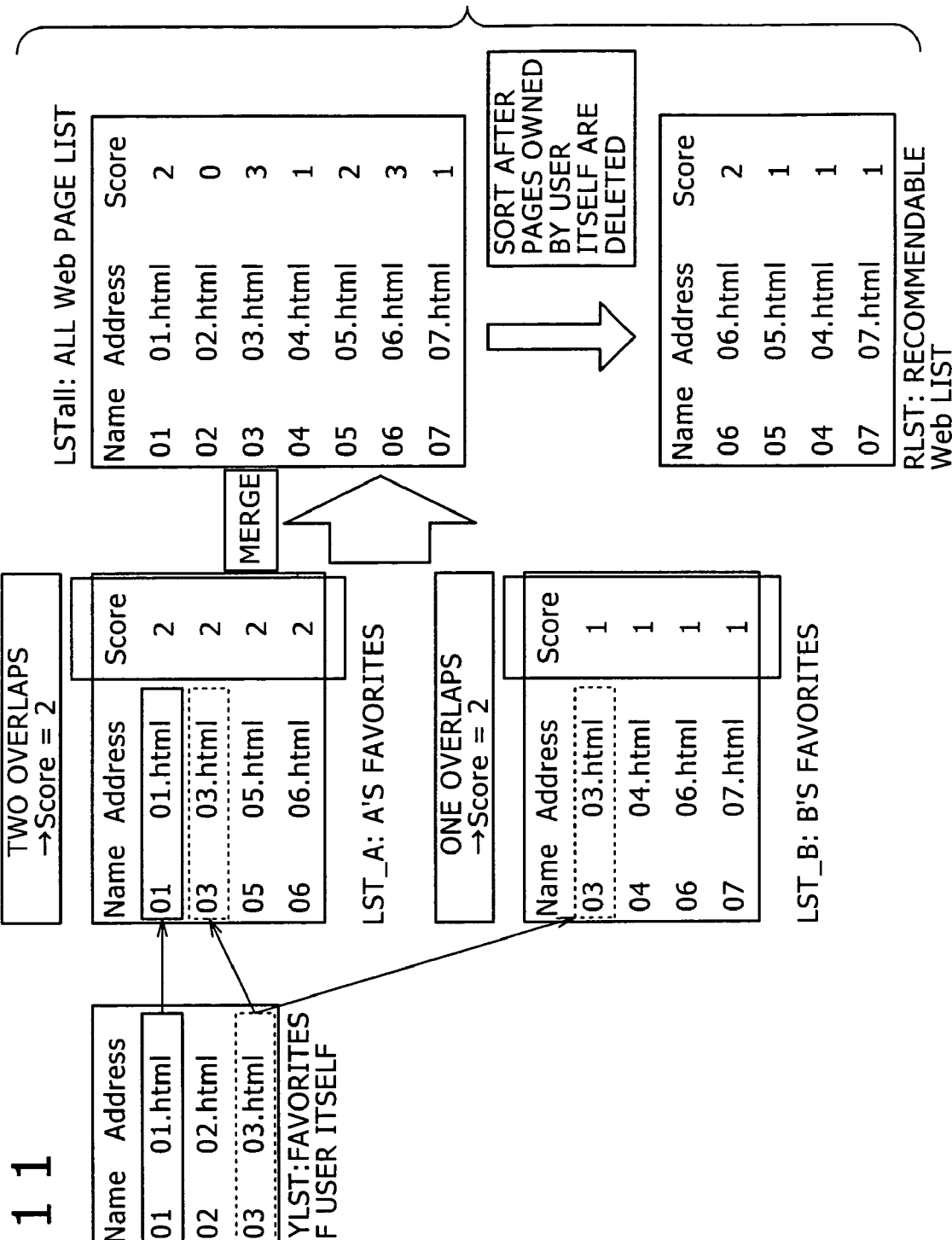
FIG. 11 is a diagrammatic view illustrating an algorithm for a list production method.

FIG. 11 illustrates an algorithm of a method of producing a list. The following lists are produced.

* "MYLST" (refer to a left upper block in FIG. 11)="favorite" list of the user itself;
  "LST_A" (refer to a central upper block in FIG. 11), "LST_B" (refer to a central lower block in FIG. 11)="favorite" lists (lists with score) where the users "A" and "B" are taken as examples;
  "LSTall" (refer to a right upper block of FIG. 11)=list (list with score) obtained by merging (combining) LST_A and LST_B; and
  "RLST" (refer to a right lower block of FIG. 11)=recommendation list (list with score) obtained by sorting items of LSTall after items of MYLST are deleted.

A production procedure of RLST is described below.
(1) Collection of "favorite" lists from the users;
(2) Score calculation (determine the overlapping degree between the items of MYLST and the items of LST_A and LST_B;
(3) Combination of the lists (production of LSTall); and
(4) Production of RLST.

In the present example, each list includes "Name" and "Address", and where MYLST and LST_A are compared with each other, since "01.hmtl" and "03.hmtl" exhibit an overlap, the score of LST_A is calculated as "2" (overlapping degree=2). On the other hand, where MYLST and LST_B are compared with each other, since only "03.hmtl" exhibits an overlap, the score of LST_B is calculated as "1" (overlapping degree=1).

In LSTall obtained by the list combination, addition of the score is performed with regard to the items of "Name" and "Address". Since the items of "Name" and "Address" included in MYLST are unnecessary, they are deleted, and the remaining items are re-arranged in the descending order of the score to produce a recommendation list RLST (in the example illustrated, "06.hmtl" of the score 2 exhibits the high degree of recommendation).

The recommendation list RLST obtained in this manner is displayed in the window w1 shown in FIG. 10, and if the user selects a desired one of URLs displayed in the window w1 in this manner, then the user can access the recommended web page.

Now, a form is described wherein users who have likes and tastes similar to each other with regard to music contents exchange information therebetween to implement acquisition and reproduction of music data.

FIGS. 12 to 23 illustrate an example of installation of music software (music player) for recommending a tune as an application for implementing selective communication of a user with a person having information useful to the user from among a large number of persons.

The music player has the following functions.
1. Basic reproduction function (reproduction, fast feeding, rewinding and so forth);
2. Updating function of a user file performed explicitly (manually) or automatically;
3. Production function of a tune list based on a profile; and
4. Recommendation function of a tune list by collaborative filtering.

FIGS. 12 to 16 illustrate an example of display screens of the application.

Figure 12:
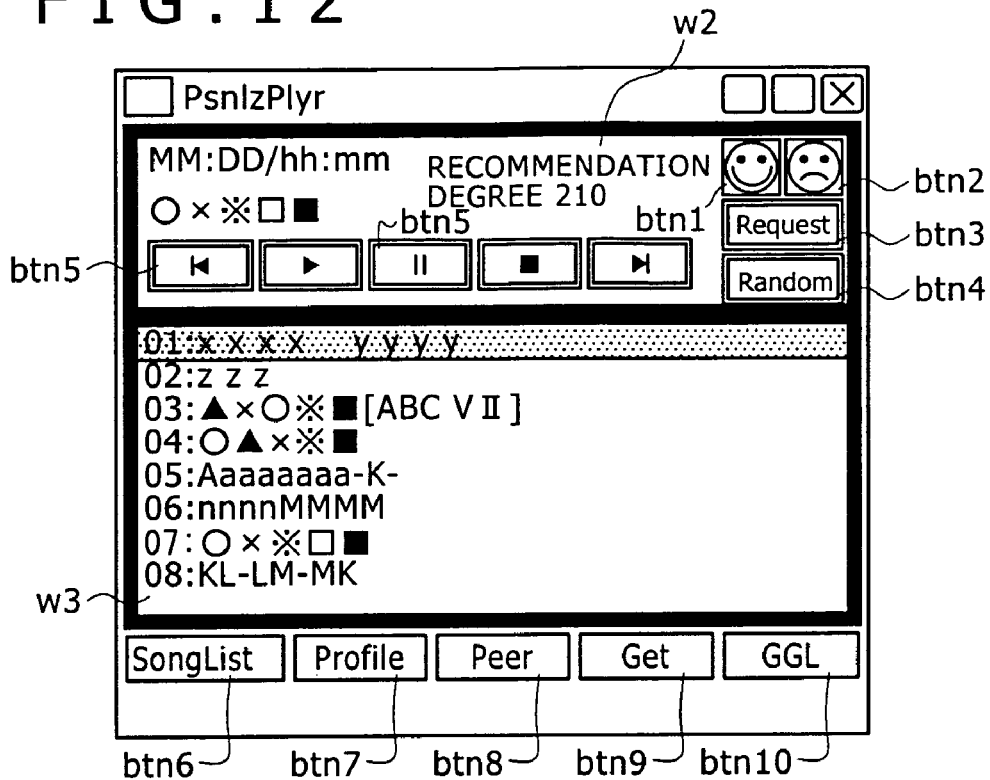
FIG. 12 is a schematic view showing another example of a display screen immediately after an application is started.

FIG. 12 shows an example of a screen immediately after the application is started. A pair of button objects with a face mark for being operated by a user to indicate a favorable impression regarding a tune are provided at a right upper portion of the display screen. If the button btn1 is operated, then the favorable impression rises, but if the button btn2 is pressed, then the favorable impression drops. Further, a recommendation degree based on a profile is displayed in the form of a numerical value in a window w2 on the left side of the buttons btn1 and btn2.

A button btn3 positioned below the buttons btn1 and btn2 is a request button, and a button btn4 for random reproduction is provided below the button btn3. Further, buttons btn5 for performing such operations as reproduction, stopping, fast feeding and rewinding of a tune are disposed on the left side of the button btn4. A window w3 for displaying various kinds of information is provided below the buttons btn5, and a list of tunes or the like is displayed in the window w3. A plurality of button objects are disposed in a horizontal row below the window w3 and include, for example, a button btn6 for displaying a tune list, a button btn7 for displaying a profile of a user, a button btn8 for searching for communication opposite parties, a button btn9 for acquiring contents, and a button btn10 for accessing to a search engine.

Figure 13:
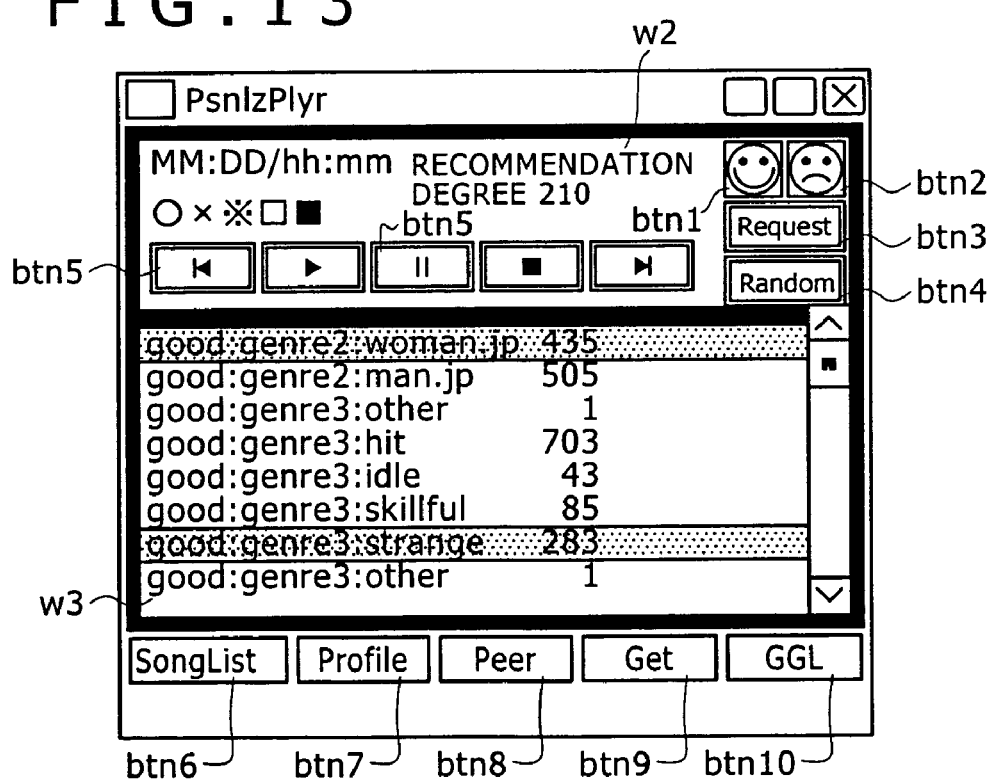
FIG. 13 is a similar view but showing an example of a screen where profile data are displayed.

FIG. 13 shows an example of a screen where file data (metadata of genres and so forth) are displayed in the window w3 as a result of operation of the button btn7. In the example illustrated, metadata relating to a song or a tune of an object of reproduction is distinguishably surrounded by a horizontally elongated rectangular framework.

Figure 14:
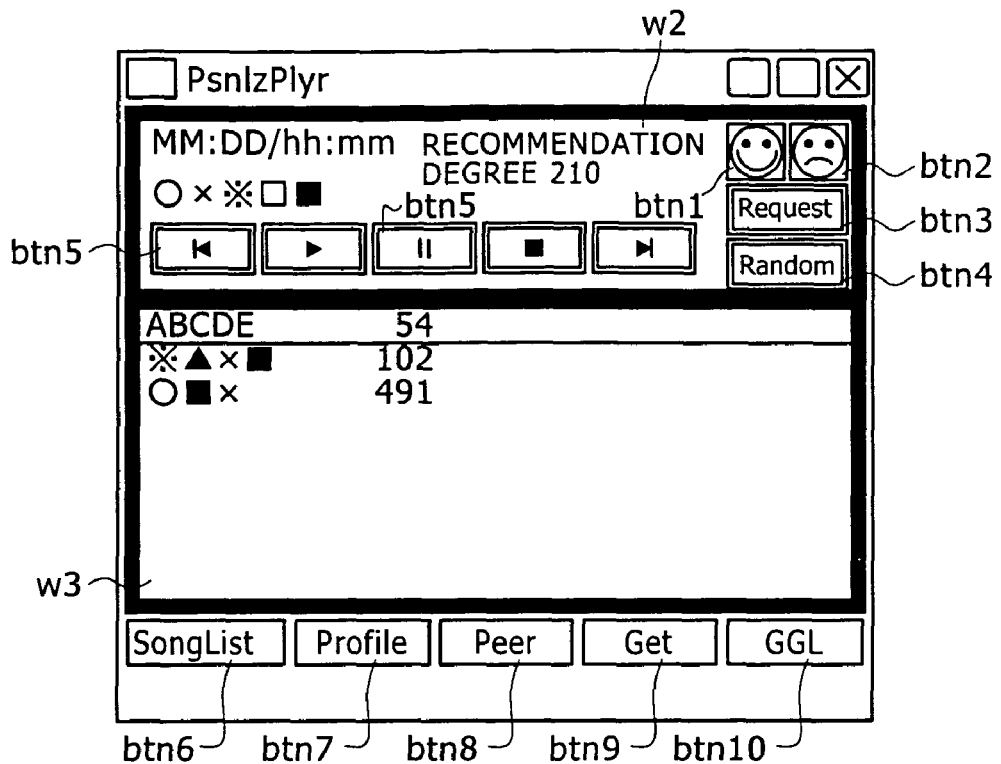
FIG. 14 is a similar view but showing an example of a screen where opposite parties with which communication is possible and vector spatial distances of the opposite parties are displayed.

FIG. 14 shows an example of a screen wherein those opposite parties with which the user can communicate and vector spatial distances to them are displayed within the window w3 as a result of operation of the button btn7. In the present example, the name of a communication opposite party selected at present and the correlativity (vector spatial distance) to the communication opposite party are distinguishably surrounded by a horizontally elongated rectangular framework.

Figure 15:
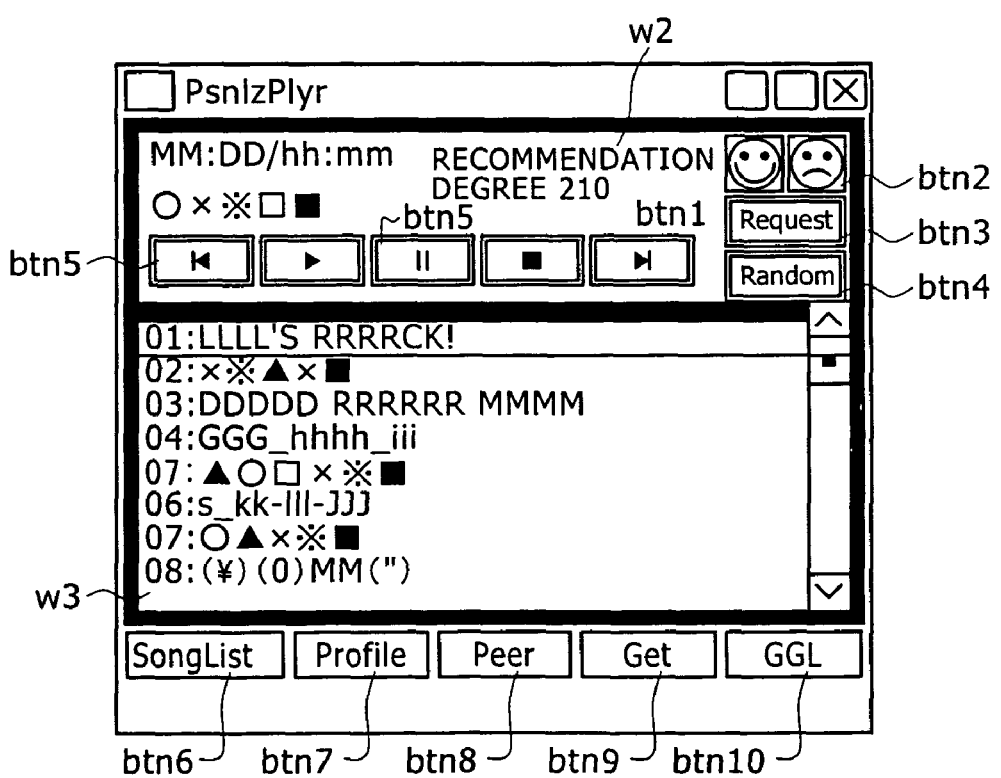
FIG. 15 is a similar view but showing an example of a screen where a recommendable tune list from a communication opposite party is displayed.

FIG. 15 shows an example wherein a recommendation tune list produced by and transmitted from a communication opposite party is displayed on the screen. In the present example, if an operation for selecting a desired piece of contents is performed by a user, then the corresponding portion of the contents is distinguishably surrounded by a horizontally elongated rectangular framework, and the recommendation degree of the contents is displayed in the form of a numerical value on the left side of the button btn1.

Figure 16:
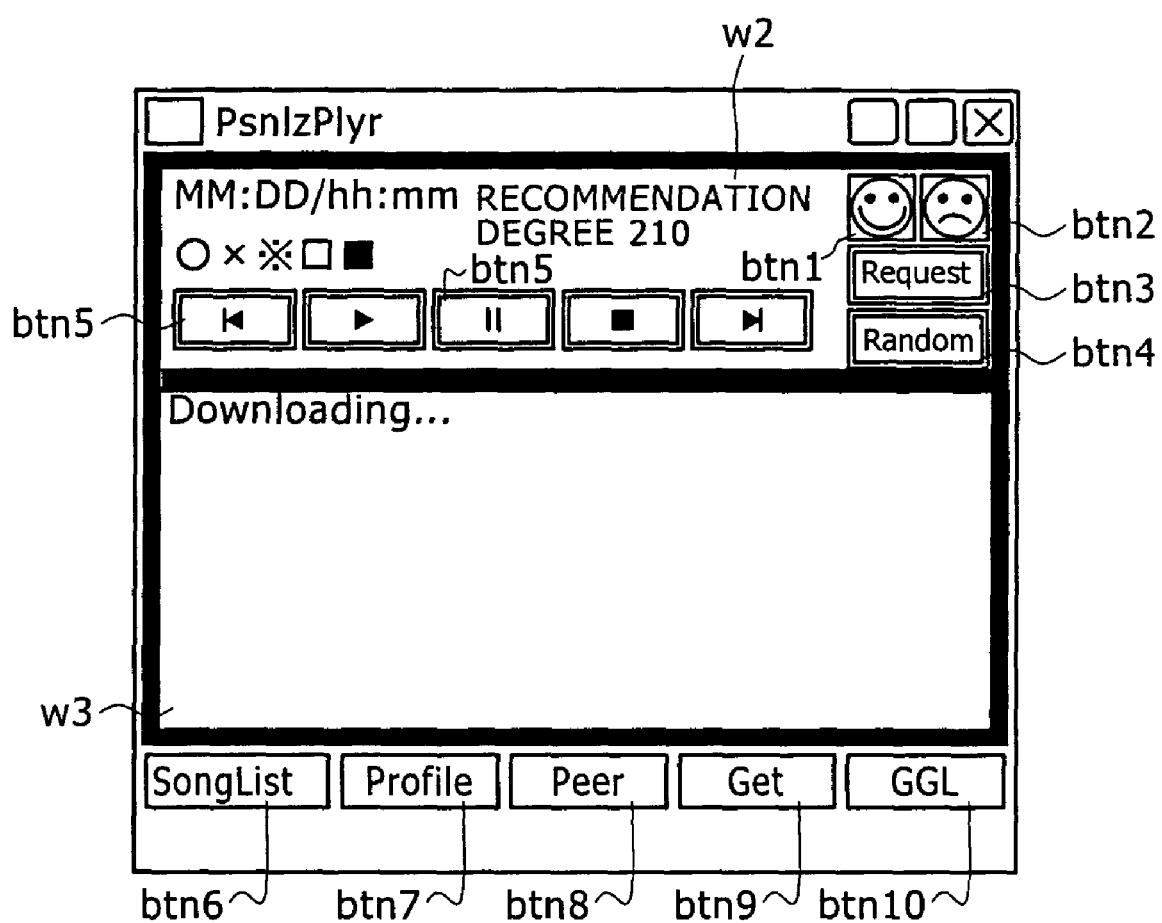
FIG. 16 is a similar view but showing an example of a display screen while contents selected by the user are being acquired.

FIG. 16 shows an example of a screen while the contents selected in FIG. 15 are being acquired (being downloaded).

As regards the reproduction function described hereinabove, the buttons btn5 for operation are used to perform reproduction of music or the like in accordance with program processing coordinated with operation events of the buttons.

Further, in the present music player (application), a profile of a user is used. The profile is formed using, for example, 30 different kinds of metadata (genre data, sex data of a singer and so forth). Where metadata are applied in advance to music to be reproduced, the user can update the profile of the user itself while listening the music. In the present application, profiles of different users are compared with each other so that any user can select and communicate with an opposite party who has a liking similar to that of the user.

The user may update the profile thereof using, for example, any of the following methods.
(a) Method of using the pertaining operation button to explicitly change the profile data;
(b) Method of supervising an operation, a behavior pattern or the like of the user to implicitly change the profile data without requiring an intentional operation by the user; and
(c) Method of using both of the methods (a) and (b) above.

According to the method (a), for example, the user presses the button btn1 (Good button) or btn2 (Bad button) for indicating whether or not the user likes the tune being currently enjoyed to explicitly vary the profile data. Consequently, the result of the profile data is updated in each case.

Meanwhile, according to the method (b), the application side analyzes such a pattern of operation behavior that, for example, the user enjoys a tune to the last or skips a tune midway or else repeats a tune, and automatically updates the profile data automatically so that a result of the analysis may be reflected on the profile data.

It is to be noted that, according to the method (c) described above, the methods (a) and (b) can be used as occasion demands, and a known method can be used for such updating of the profile.

Further, according to the music player of the present example, a profile of a user can be used to automatically produce a tune list.

If the button btn7 is pressed while the application is operative, then the screen to be displayed can be changed over to a screen for displaying profile data of a user as shown in FIG. 13.

In order for a user to find an opposite party whose liking of music is similar to that of the user, the user must first search for those persons who have a connection to the same network. Therefore, the button btn8 for search is pressed to search for opposite parties with which the user can communicate as seen in FIG. 14. The numerical value shown on the right side of the name of each communication opposite party represents a vector spatial distance between the profile of the opposite party and the profile of the user itself. (As the numerical value decreases, the degree of similarity of the liking of the opposite party to that of the user is higher, that is, the opposite party has a profile more similar to that of the user.)

A program process associated with an operation event of the button btn8 includes the following steps.

Step of transmitting the profile of the user itself to the opposite party at a point of time when the button is pressed; and Step of requesting the opposite party to calculate a vector spatial distance of the profile of the user from the profile of the opposite party and receiving a result of the calculation transmitted from the opposite party.

The user refers to the vector spatial distances displayed in the window w3 to decide an opposite party with whom the user is to actually communicate. After the user performs, for example, an operation of moving a mouse pointer to a desired opposite party and clicking the mouse button to decide a communication opposite party, the following process is performed (the following steps are included in the program process coordinated with an operation event when an opposite party with which the user is to communicate is decided).

Step of transmitting the profile of the user itself to the decided opposite party; and Step of receiving, when the user refers to a list of music contents owned by the opposite party and the profile of the user and receives a recommendation tune list produced by the opposite party in response to a request based on a result of the reference, a result of the production and presenting the recommendation tune list on the screen.

Figure 17:
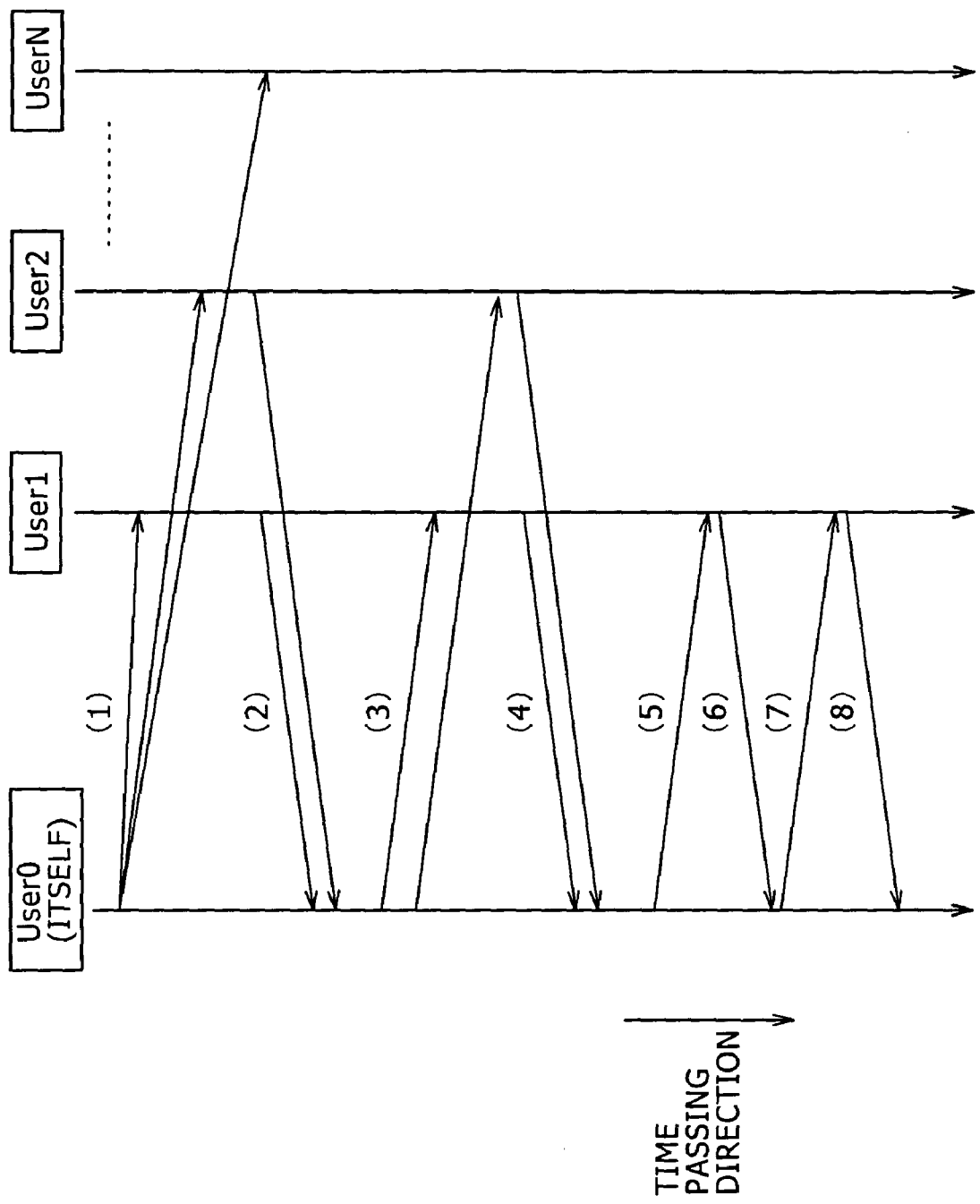
FIG. 17 is a diagram illustrating a flow of processes after broadcast communication until acquisition of contents.

It is to be noted that, since there is no necessity to display all of opposite parties, with which the user can communicate, together with vector spatial distances of them, for example, it is possible to determine those opposite parties who have likes and tastes similar to that of the user itself with reference to a reference value for a vector spatial distance and display only the determined opposite parties in a ranking form or the like (for any opposite party who does not have likes and tastes similar to that of the user, the opposite party and the vector spatial distance thereof are not displayed by a masking process). The reference value for a vector spatial distance may be set in accordance with an instruction of the user or may be set in advance (for example, where the similarly degree is defined to high, medium and low or the like, a reference value is determined for each case).

Where a recommendation tune list is displayed in the window w3 as seen in FIG. 15, the user can select desired contents from within the displayed recommendation tune list. Then, if the user presses the button btn9 to acquire the contents, then downloading of the desired contents is started as seen in FIG. 16. Consequently, the desired contents can be acquired from the communication opposite party or a site of a linking destination or the like.

Where the flow of processes described above can be summarized simply in a command form as given below (refer to FIG. 17). An arrow mark of a thick line represents a user and an apparatus used by the user, and an arrow mark of a thin line extending between such thick line arrow marks represents a flow of a signal or data).

(1) BROADCAST (broadcast communication: "User 0"→"User 1, User 2, ..., User N")
(2) RESPONSE (response: "User 1, User 2"→"User 0")
(3) SEND PROFILE (profile transmission: "User 0"→"User 1, User 2")
(4) SEND_SCORE (correlativity acquisition: "User 1, User 2"→"User 0")
(5) REQUEST_SONG_LIST (tune list request: "User 0"→"User 1")
(6) SEND_SONG_LIST (tune list transmission: "User 1"→"User 0")
(7) REQUEST_FILE (contents request: "User 0"→"User 1")
(8) SEND_FILE (contents transmission: "User 1"→"User 0")

The flow of processes described above is that in a case wherein the "User 0" above is the user itself, and in the present example, the User 1 and the User 2 from among the "User 1, User 2, ..., User N" respond and then the User 1 who exhibits a comparatively short vector spatial distance to the user itself is decided as a communication opposite party. Further, "X"→"Y" indicates the direction of communication from X to Y.

It is to be noted that the flow of processes is not limited to the present example, but may be modified such that, for example, the processes (1) and (3) are collected and/or the processes (2) and (4) are collected.

FIGS. 18 to 21 illustrate another example of a screen display form relating to an application.

Figure 18:
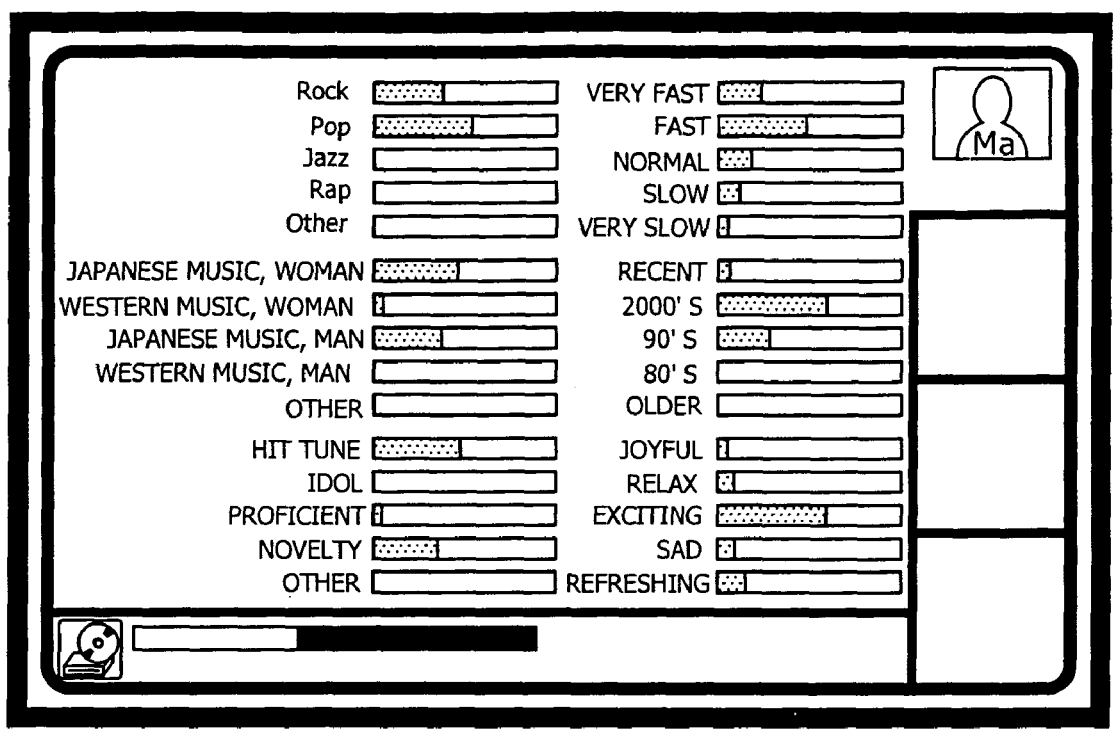
FIG. 18 is a schematic view showing an example of a display screen of a profile of the user itself as a different example of a form of screen display.

FIG. 18 illustrates a profile of a user itself (distinguished using a face mark "Ma" at the right upper corner of the screen) in a bar chart display of horizontal bars. On the screen shown, data regarding the genre, tempo, mood, sex of the singer of Japanese music or Western music and so forth are displayed.

Figure 19:
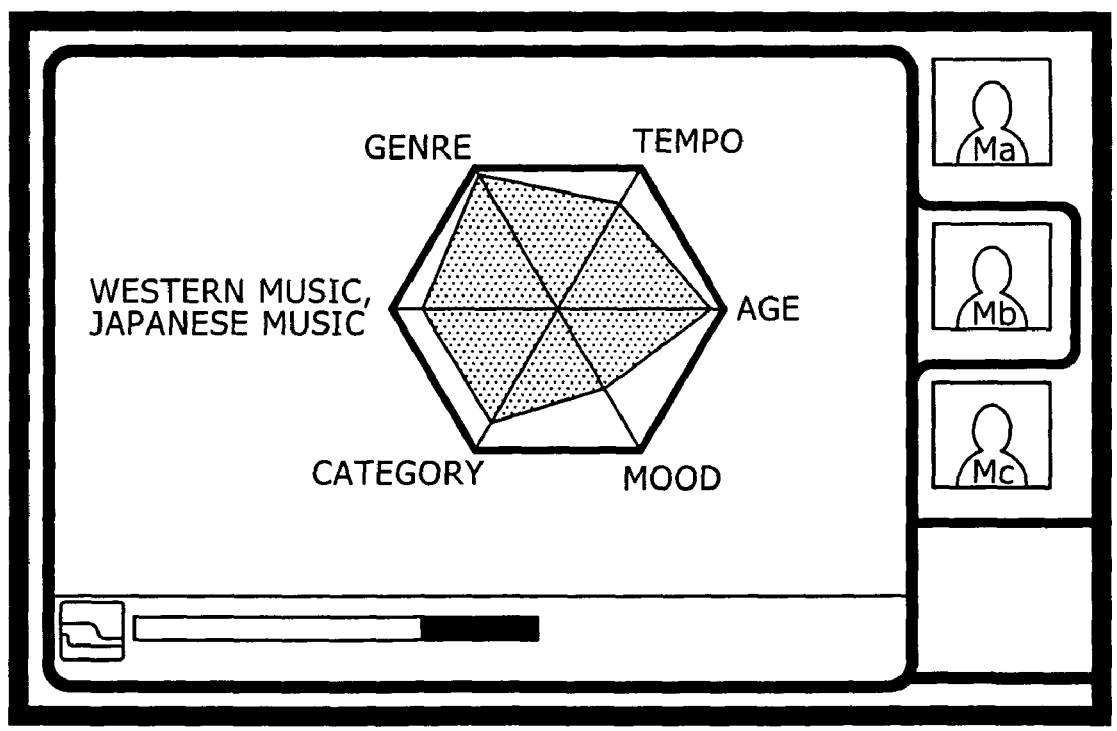
FIG. 19 is a similar view but showing an example of a screen where a correlativity between the user and an opposite party is displayed.

FIG. 19 illustrates an example wherein the correlativity (correlativity in regard to the genre, tempo, age, mood and so forth) between the user and an opposite party (identified using another face mark "Mb") in the form of a radar chart.

Figure 20:
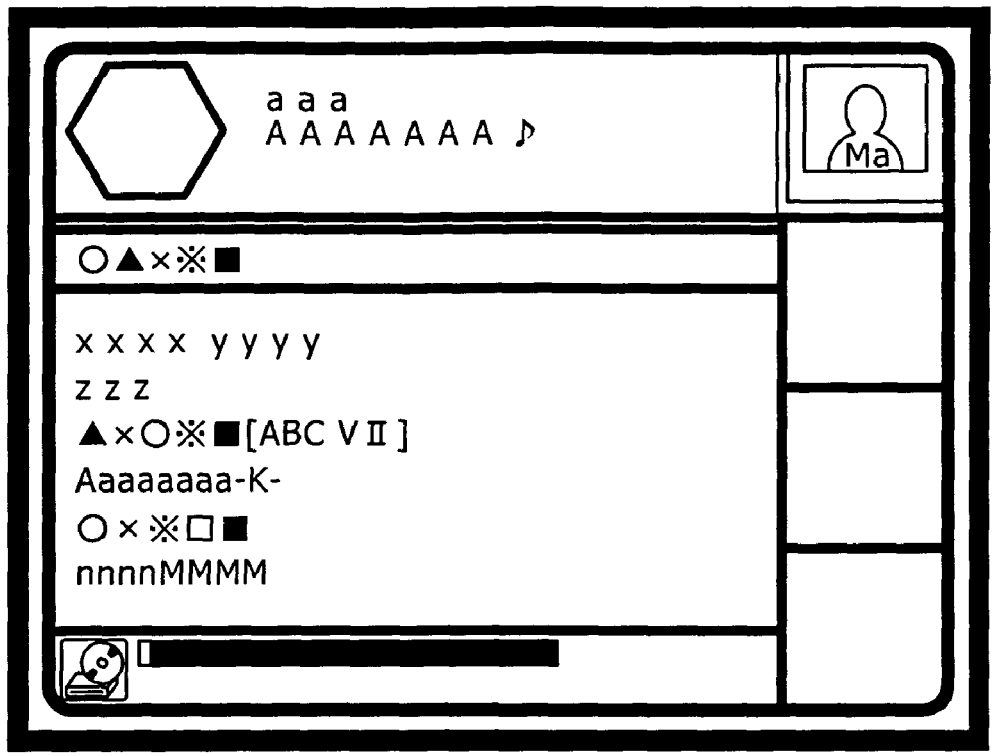
FIG. 20 is a similar view but showing an example of a screen where a desired tune to be reproduced (local reproduction) is selected from within a music contents list owned by the user itself.
Figure 21:
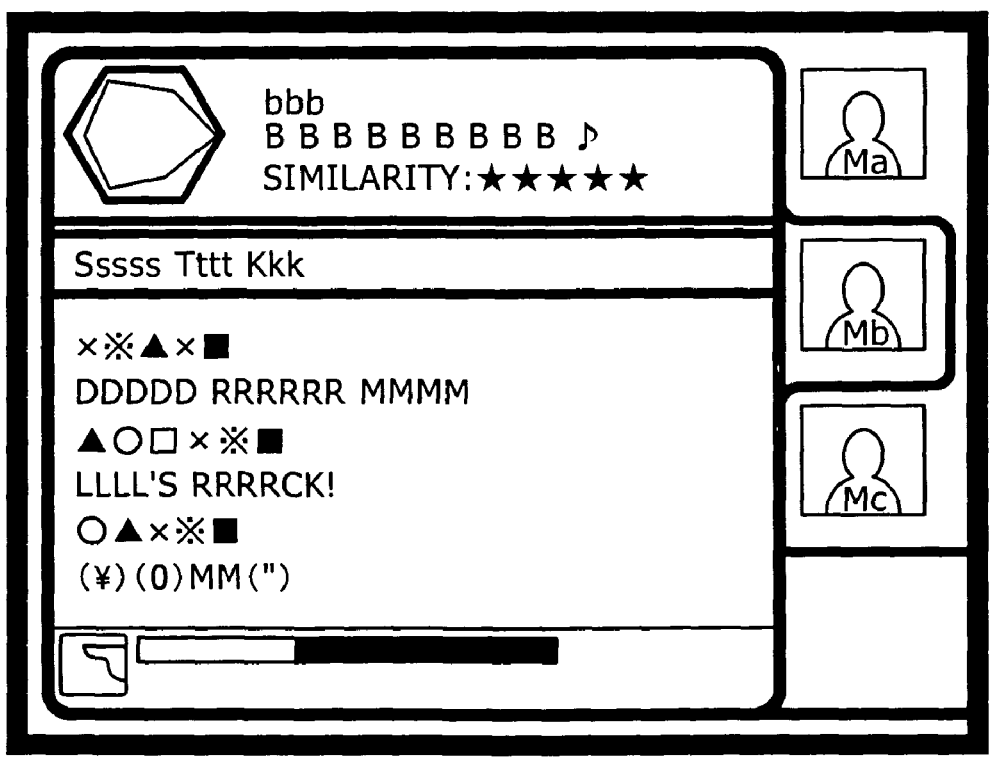
FIG. 21 is a similar view but showing an example of a screen where a desired tune to be reproduced (network reproduction) is selected from within a music contents list owned by the opposite party.

FIG. 20 shows a screen in a case (local reproduction) wherein a desired tune is selected and reproduced from within a list of music contents owned by the user itself (identified using the face mark "Ma"). Meanwhile, FIG. 21 shows a screen in another case (network reproduction) wherein a desired tune is selected and reproduced from within a list of music contents owned by the opposite party: (identified using the face mark "Mb"). In FIG. 21, the correlativity to the opposite party is indicated by the number of "★" marks above the display region for a tune list, and on the left side of the display of the correlativity, a radar chart similar to that of FIG. 19 is displayed in a reduced scale.

Some of metadata used for a profile can be automatically extracted by analyzing a tune to detect a characteristic amount of the tune, for example, like a tempo or a speed feeling.

For example, as a method of detecting a tempo or the like, a method can be applied wherein a level signal representative of transition of the sound signal level is produced and frequency analyzed and a characteristic amount of the sound signal is calculated based on a result of the frequency analysis.

Figure 22:
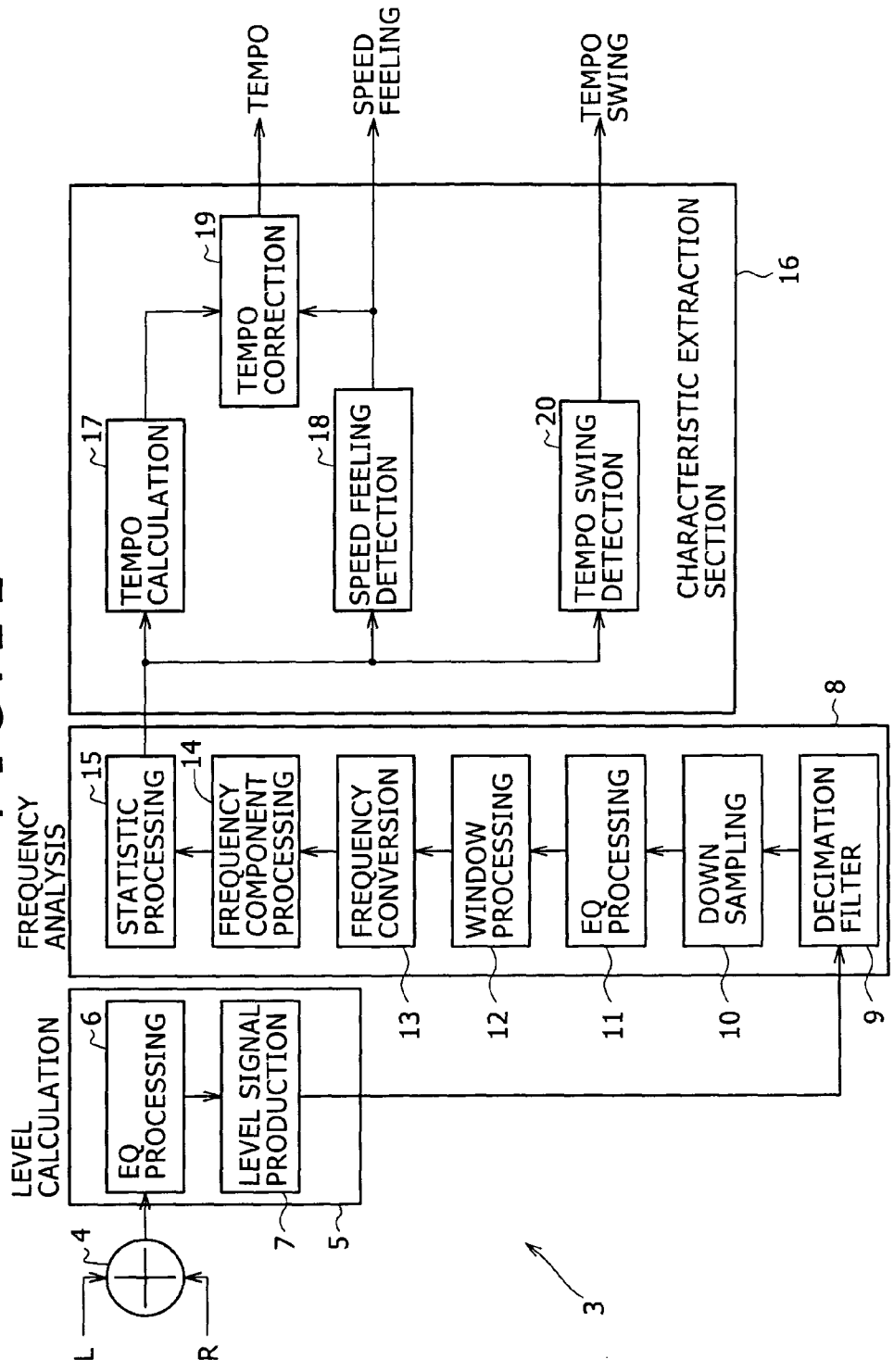
FIG. 22 is a block diagram showing an example of a configuration of a tune characteristic amount detection section of the information processing apparatus.

FIG. 22 shows an example of a configuration of a characteristic amount detection section 3. If a digital signal of a reproduced tune is supplied to the characteristic amount detection section 3, then the characteristic amount detection section 3 detects a tempo, a speed feeling and a swing of tempo and outputs a result of the detection.

Sound signals of the left and right channels of a tune are supplied to and added by an adder 4, and a result of the addition is supplied to a level calculation section 5 at the following stage.

The level calculation section 5 produces a level signal representative of transition of the sound signal level after the addition and supplies the level signal to a frequency analysis section 8 at the following stage. The level calculation section 5 includes, for example, an EQ (Equalize) processing section 6 and a level signal production section 7. The EQ processing section 6 performs a filter process for the sound signal from the adder 4 to remove low frequency components which are not suitable for extraction of a tempo using a high-pass filter (HPF). Then, the remaining frequency components suitable for extraction of a tempo are supplied to the level signal production section 7. The level signal production section 7 produces, based on the frequency components received, a level signal representative of transition of the sound signal level. The level signal may represent an absolute value, a power value (second power) or a moving average of such absolute value or power value, a value used for level indication on a level meter or the like.

The frequency analysis section 8 receives the signal supplied from the level calculation section 5 and performs a frequency analysis of the received signal. Then, the frequency analysis section 8 supplies a result of the analysis to a characteristic extraction section 16 and includes, for example, such components as given below (numerical values in parentheses represent reference numerals shown in FIG. 22).

decimation filter section (9)
down sampling section (10)
EQ processing section (11)
window processing section (12)
frequency conversion section (13)
frequency component processing section (14)
statistic-processing section (15)

The decimation filter section 9 removes high frequency components of the level signal supplied thereto from the level signal production section 7 and supplies a resulting level signal to the down sampling section 10. The down sampling section 10 performs down sampling of the level signal. For example, for detection of a tempo, since only frequency components of approximately several hundreds Hz of the level signal are required, down sampling is performed by sampling out samples of the level signal, and a filtering process is performed by the EQ processing section 11 at the following stage. Here, a DC component, frequency components lower than a frequency corresponding to the tempo 50 (the "tempo i" is defined as a tempo of a sound signal where the number of quarter notes for one minute is i. Therefore, in the case of the tempo 50, the number of quarter notes for one minute is 50) and high frequency components, for example, frequency components higher than a frequency corresponding to the tempo 400, are removed. In short, those low frequency components and high frequency components which are not suitable for extraction of a tempo are removed.

Then, the level signal after the filter process is supplied to the window processing section 12, by which a time series signal is extracted from the level signal, more particularly from each block which includes a predetermined number of samples of the level signal. Further, in order to reduce the influence of a sudden variation of the level signal at the opposite ends of each block, the window processing section 12 performs a window process for the level signal for each block using a window function such as a Hamming window or a Hanning window which gradually attenuates the opposite end portions of each block (that is, multiplies the level signal for each block by the window function). Then, the window processing section 12 supplies a result of the window process to the frequency conversion section 13.

The frequency conversion section 13 performs such a process as discrete cosine transform to frequency convert (frequency analyze) the level signal. Then, the frequency conversion section 13 supplies, from among frequency components obtained by the frequency conversion, those frequency components of frequencies corresponding to the tempos from 50 to 1,600 to the frequency component processing section 14.

The frequency component processing section 14 adds, to those of the frequency components of the level signal for each block from the frequency conversion section 13 which have frequencies corresponding, for example, to the tempos from 50 to 400, frequency components (harmonics) of frequencies corresponding to twice, three times and four times the tempo individually. The frequency component processing section 14 determines results of the addition as frequency components of the frequencies corresponding to the tempos.

For example, to a frequency component of a frequency corresponding to the tempo "t", a tempo "2·t" which is twice the tempo "t", another tempo "3·t" which is three times the tempo "t" and a further tempo "4·t" which is four times the tempo "t" are added, and a result of the addition represents the frequency component of the frequency corresponding to the tempo "t". It is to be noted that, for example, the frequency component corresponding to the tempo 100 which is added to determine the frequency component corresponding to the tempo 50 is the frequency component corresponding to the tempo 100 before the frequency components of the harmonics are added thereto.

The frequency component processing section 14 obtains, for each block of the level signal, results of the addition, to the frequencies corresponding to the range of the tempo 50 to the tempo 400, of the frequency components of the harmonics of them, and supplies the results of the addition to the statistic processing section 15.

The statistic processing section 15 performs a statistic process for blocks for one tune. In particular, the statistic processing section 15 adds the frequency components of the level signal for one tune supplied thereto in a unit of a block from the frequency component processing section 14 for the individual frequencies. Then, the statistic processing section 15 supplies results of the addition of the frequency components over the blocks for one tune obtained by the statistic process as frequency components of the level signal of the tune to the characteristic extraction section 16.

The characteristic extraction section 16 includes a tempo calculation section 17, a speed feeling detection section 18, a tempo correction section 19 and a tempo swing detection section 20.

The tempo calculation section 17 calculates the tempo of the sound signal based on the signal from the frequency analysis section 8 and supplies the calculated tempo to the tempo correction section 19.

The tempo calculation is performed in the following procedure.

(1) A maximum frequency component is detected from among the frequency components of the level signal supplied from the frequency analysis section 8.

(2) From the maximum frequency component of (1) above, a basic frequency (which is represented by "fb") of the level signal is decided.

(3) The tempo t is determined in accordance with "t=fb/fs× 60" based on the basic frequency fb and the sampling frequency (which is represented by "fs").

The speed feeling detection section 18 detects a speed feeling of the sound signal based on the signal from the frequency analysis section 8 and supplies the detected speed feeling to the tempo correction section 19.

The speed feeling detection is performed in the following procedure.

(1) Peaks are detected from among the frequency components of the level signal supplied from the statistic processing section 15, and frequency components (A1 to An) which exhibit n (for example, n=10) comparatively high values from among the detected peaks are extracted.

(2) All of the n frequency components are summed ($\Sigma Ai=A1+A2+\ldots+An$).

(3) The integrated value "$\Sigma(Ai \times fi)=A1 \times f1+A2 \times f2+\ldots+An \times fn$" is calculated using the frequency components A1 to An and the corresponding frequency values f1 to fn.

(4) The speed feeling S is calculated in accordance with "$S=\Sigma(Ai \times fi)/(\Sigma Ai)$".

It is to be noted that "Σ" above signifies a sum total regarding the natural number "i".

The tempo correction section 19 corrects the tempo supplied thereto from the tempo calculation section 17 based on the speed feeling S supplied thereto from the speed feeling detection section 18 as occasion demands to obtain a final tempo and outputs the final tempo.

The correction of the tempo is performed in the following procedure.

(1) The tempo t described above is compared with a reference value REF1, and if the t value is equal to or higher than the reference value REF1, then the processing advances to (2) below, but if the t value is lower than the reference value REF1, then the processing advances to (3) given below.

(2) The speed feeling S is compared with a predetermined reference value REF2, and if the S value is equal to or higher than the reference value REF2, then the processing advances to (4) given below, but if the S value is lower than the reference value REF2, then the processing advances to (5) given below.

(3) The speed feeling S is compared with another predetermined reference value REF3, and if the S value is equal to or higher than the reference value REF3, then the processing advances to (6) given below, but if the S value is lower than the reference value REF3, then the processing advances to (4) below.

(4) The tempo t is adopted as it is, and then the processing advances to (7) given below.

(5) The tempo t is divided by two and a resulting t value is determined as a tempo after correction, and then the processing advances to (7) given below.

(6) The tempo t is doubled and a resulting t value is determined as a tempo after correction, and then the processing advances to (7) below.

(7) The tempo value is settled.

The tempo swing detection section 20 detects a tempo swing (swing of tempo) based on the signal from the frequency analysis section 8.

The detection of a tempo swing is performed in the following procedure.

(1) Frequency components of the frequencies corresponding to the range of the tempo from 50 to 400 supplied from the frequency analysis section 8 are summed over all of the frequencies (sum value=$\Sigma A$).

(2) From among the frequency components A of the frequencies corresponding to the range of the temp from 50 to 400, a maximum frequency component (which is represented by "A1") is extracted.

(3) A tempo switch W is calculated in accordance with "W=$(\Sigma A)/A1$".

A tune can be classified using information of the tempo and the tempo swing. For example, classic music or the like is normally slow in tempo and exhibits a great tempo swing. On the other hand, music in which an electronic drum or the like is used is normally fast in tempo and exhibits a small tempo swing. The genre or the like of a tune can be identified based on such characteristics as described above, and a result of the identification can be utilized as metadata.

Figure 23:
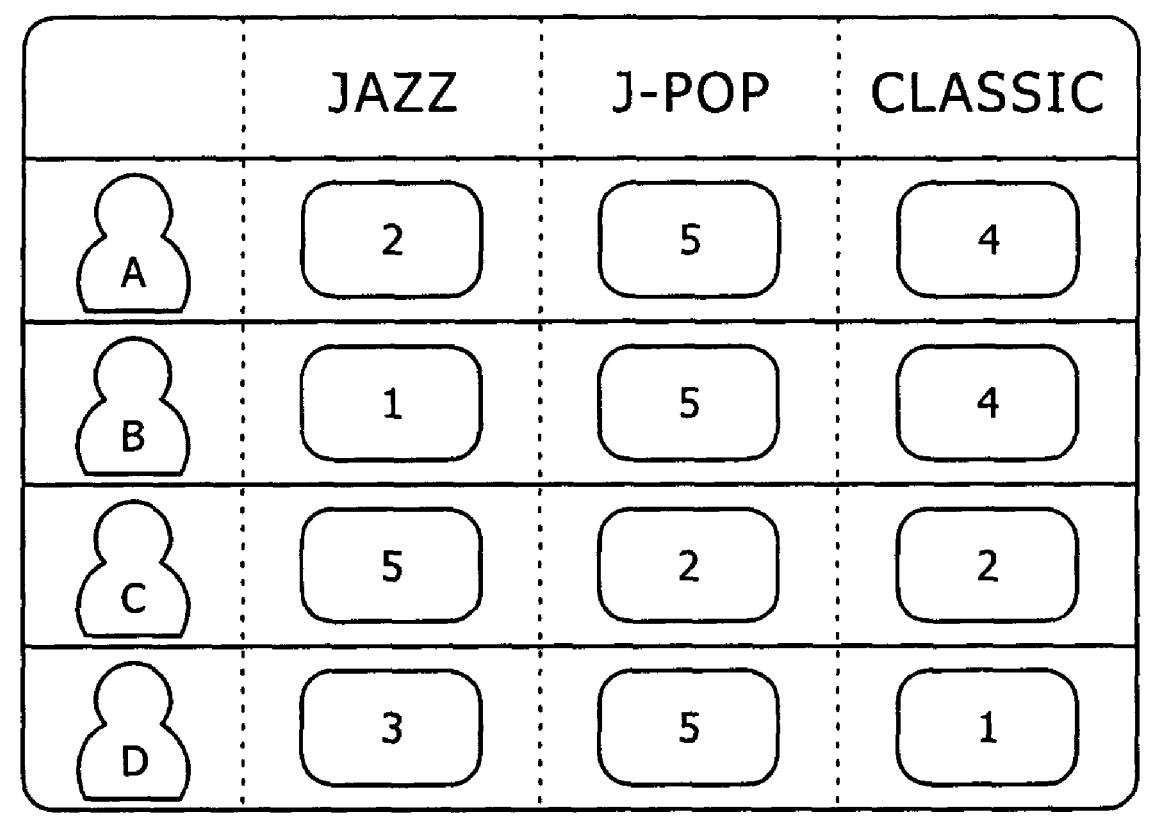

FIG. 23 illustrates the degrees of interest of users A to D in metadata for different genres. The degree of interest indicates that, where the value thereof is high, the degree of interest is high.

For example, the users A and B have a high degree of interest in pops (J-Pop) and classic music (Classic) and the vector spatial distance between the users A and B is small. However, the user C has a high degree of interest in jazz (Jazz), and the vector spatial distance between the user C or the user A or B is great.

As described above, since a characteristic amount is detected by a frequency analysis of a tune and a result of the extraction can be reflected on a profile of a user, such a labor of a user as to input a genre or the like of a tune every time can be eliminated. For example, if a sound signal of a tune reproduced is analyzed by the application side, then it is possible to accurately grasp such information as whether the user likes tunes of a fast tempo or tunes of a slow tempo.

According to the configuration described above, the following advantages can be anticipated.

Since client machines can be connected to each other in a mutually equal relationship on a network to perform collaborative filtering, a large-scale server is not required (where a recommendation service of contents or the like is to be performed by collaborative filtering, the cost upon introduction of a server or the cost for maintenance after the start of service is reduced significantly.

When each user can selectively perform communication only with persons having information useful to the user from among a large number of persons, it is possible to determine a vector spatial distance between the user and each of the persons by interpersonal communication in the form of a P2P model to calculate a correlativity between the user and each of the persons and then select and communicate with an opposite party based on a result of the calculation (information exchange can be performed after communication opposite parties are narrowed down).

It is possible to use a profile obtained by analyzing characteristics of tunes, frequencies or methods of reproduction of a user and so forth to quantify likes and tastes of the user to find out companions having a common preference and introduce tunes having a high favorable impression between each other or try to listen an introduced tune.

Where metadata is used for description of a profile, the burden on a calculation process of the correlativity can be moderated (because the communication opposite party does not always use an information processing apparatus of a high performance).

Production, updating and so forth of a profile can be performed utilizing a result of extraction of a characteristic amount such as the tempo by automatic analysis of a tune.

While a preferred embodiment of the present invention has been described using specific terms, such description is for illustrative purposes only, and it is to be understood that changes and variations may be made without departing from the spirit or scope of the following claims.

What is claimed is:

1. An information transmission system using collaborative filtering for transmitting and receiving profile information between apparatuses in a network to perform a notification or an exchange of content data, the information transmission system comprising:

a first apparatus configured to transmit profile information for classifying the content data based on a category or an attribute of the content data to a plurality of second apparatuses, wherein each one of the plurality of second apparatuses that receives profile information from the first apparatus is configured to calculate a vector spatial distance, indicating a correlativity value, based on the profile information received from the first apparatus and the profile information of the one of the plurality of second apparatuses, and to transmit the vector spatial distance to the first apparatus, and the first apparatus is further configured to select at least one of the plurality of second apparatuses having a highest correlativity value, and to at least one of request and receive the content data from the selected at least one of the second apparatuses wherein the first apparatus is further configured to select, from among the plurality of second apparatuses a second apparatus having a minimum value of the calculation results of the vector spatial distance that was sent back to the first apparatus, or to select from among the plurality of second apparatuses at least one apparatus having a calculation result of the vector spatial distance having a value lower than a reference value set in advance has been sent back to the first apparatus, and said vector spatial distance is calculated as $L=\Sigma(\alpha i \cdot f(\Delta Ei)$ where $\Sigma$ signifies a sum total with regard to i, and $\alpha i$ signifies a weighting coefficient for weighting, $\Delta Ei$ signifies differences between individual profile data, and $f(\ )$ signifies a function pertaining a cumulative effect of a magnitude of difference of $\Delta Ei$.

2. An information processing apparatus for use with an information transmission system using collaborative filtering for transmitting and receiving profile information in a network to perform a notification or an exchange of content data, the method comprising:

calculation means for calculating a vector spatial distance, indicating a correlativity between profile information from said information processing apparatus and profile information received from each one of a plurality of second apparatuses, the calculation being performed by each one of the plurality of second apparatuses, the profile information including data for classifying the content data based on a category or an attribute of the content data;

transmission means for sending back a result of the vector spatial distance calculation by said calculation means to each one of the plurality of second apparatuses via peer to peer communication, and for sending content data to at least one of one of the plurality of second apparatuses wherein the apparatus is further configured to select, from among the plurality of second apparatuses a second apparatus having a minimum value of the calculation results of the vector spatial distance that was sent back to the apparatus, or to select from among the plurality of second apparatuses at least one apparatus having a calculation result of the vector spatial distance having a value lower than a reference value set in advance has been sent back to the apparatus, and said vector spatial distance is calculated as $L=\Sigma(\alpha i \cdot f(\Delta Ei)$ where $\Sigma$ signifies a sum total with regard to i, and $\alpha i$ signifies a weighting coefficient for weighting, $\Delta Ei$ signifies differences between individual profile data, and $f(\ )$ signifies a function pertaining a cumulative effect of a magnitude of difference of $\Delta Ei$.

3. An information processing apparatus for use with an information transmission system using collaborative filtering for transmitting and receiving profile information in a network to perform a notification or an exchange of content data, the information apparatus comprising:

means for transmitting, via peer to peer communication, profile information from said information processing apparatus to a plurality of different apparatuses which are individually used by different users, the profile information including data for classifying the content data based on a category or an attribute of the content data;

means for selecting each of a plurality of different apparatuses defining the communication opposite parties having a comparatively high correlativity when results of a vector spatial distance calculation performed and sent back from each of the different apparatuses are received; and means for requesting or receiving the content data from one of the selected apparatuses wherein the apparatus is further configured to select, from among the plurality of second apparatuses a second apparatus having a minimum value of the calculation results of the vector spatial distance that was sent back to the apparatus, or to select from among the plurality of second apparatuses at least one apparatus having a calculation result of the vector spatial distance having a value lower than a reference value set in advance has been sent back to the apparatus, and said vector spatial distance is calculated as $L=\Sigma(\alpha i \cdot f(\Delta Ei)$ where $\Sigma$ signifies a sum total with regard to i, and $\alpha i$ signifies a weighting coefficient for weighting, $\Delta Ei$ signifies differences between individual profile data, and $f(\ )$signifies a function pertaining a cumulative effect of a magnitude of difference of $\Delta Ei$.

4. A non-transitory computer readable storage medium encoded with a computer readable program configured to cause an information processing apparatus for transmitting and receiving profile information in a network to perform a notification or an exchange of content data, the method comprising:

calculating with a data processor a vector spatial distance, indicating a correlativity between profile information from the information processing apparatus and profile information from each different apparatus received from the different apparatus via peer to peer communication, the profile information including data for classifying the based on a category or an attribute of the content data, the calculation being performed by each different apparatus;

sending back content data based on a result of the correlativity calculation to the different apparatus so the different apparatus can select a second apparatus having a minimum value of the calculation results of the vector spatial distance that was sent back to the different apparatus, or to select from among at least one apparatus having a calculation result of the vector spatial distance having a value lower than a reference value set in advance has been sent back to the different apparatus, and said vector spatial distance is calculated as $L=\Sigma(\alpha i \cdot f(\Delta Ei)$ where $\Sigma$ signifies a sum total with regard to i, and $\alpha i$ signifies a weighting coefficient for weighting, $\Delta Ei$ signifies differences between individual profile data, and $f(\ )$signifies a function pertaining a cumulative effect of a magnitude of difference of $\Delta Ei$.

5. A non-transitory computer readable storage medium encoded with a computer readable program configured to cause an information processing apparatus for transmitting and receiving profile information in a network to perform a notification or an exchange of content data, the method comprising:

transmitting profile information from the information processing apparatus to a plurality of different apparatuses via peer to peer communication, the profile information including data for classifying the content data based on a category or an attribute of the content data;

selecting each of a plurality of different apparatuses having a comparatively high correlativity when results of a vector spatial distance calculation performed and sent back from each of the different apparatuses are received; and requesting or receiving the content data from one of the selected apparatuses wherein the apparatus selects from among the plurality of second apparatuses a different apparatus having a minimum value of the calculation results of the vector spatial distance that was sent back to the apparatus, or to select from among the different apparatuses at least one apparatus having a calculation result of the vector spatial distance having a value lower than a reference value set in advance has been sent back to the apparatus, and said vector spatial distance is calculated as $L=\Sigma(\alpha i \cdot f(\Delta Ei))$ where $\Sigma$ signifies a sum total with regard to i, and $\alpha i$ signifies a weighting coefficient for weighting, $\Delta Ei$ signifies differences between individual profile data, and f( ) signifies a function pertaining a cumulative effect of a magnitude of difference of $\Delta Ei$.

6. The information transmission system using collaborative filtering according to claim 1, wherein the content data includes at least one of a program, movie data, music data, image data, and sound data.

7. The information transmission system using collaborative filtering according to claim 1, wherein the profile information indicates at least one of a genre, an artist, an album, a track name, a play list genre, a tempo, a mood, and a gender of an artist.

* * * * *